United States Patent
Edge

(10) Patent No.: US 9,622,027 B2
(45) Date of Patent: Apr. 11, 2017

(54) SYSTEMS AND METHODS FOR NETWORK CENTRIC WLAN LOCATION OF A MOBILE DEVICE

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 93 days.

(21) Appl. No.: 13/890,200

(22) Filed: May 8, 2013

(65) Prior Publication Data

US 2013/0337831 A1  Dec. 19, 2013

Related U.S. Application Data

(60) Provisional application No. 61/689,931, filed on Jun. 15, 2012, provisional application No. 61/789,272, filed on Mar. 15, 2013.

(51) Int. Cl.
*H04W 24/00* (2009.01)
*H04W 4/02* (2009.01)
(Continued)

(52) U.S. Cl.
CPC .............. *H04W 4/02* (2013.01); *G01S 5/0205* (2013.01); *H04W 4/20* (2013.01); *H04W 64/00* (2013.01)

(58) Field of Classification Search
CPC .... H04W 64/00; H04W 4/02; H04L 29/08657
(Continued)

(56) References Cited

U.S. PATENT DOCUMENTS 5,305,466 A * 4/1994 Taketsugu .................. 455/435.1
7,613,155 B2  11/2009 Shim
(Continued)

FOREIGN PATENT DOCUMENTS

EP  1480483 A2  11/2004

OTHER PUBLICATIONS

International Search Report and Written Opinion—PCT/US2013/040433—ISA/EPO—Aug. 20, 2013.

*Primary Examiner* — Nghi H Ly
(74) *Attorney, Agent, or Firm* — Kilpatrick Townsend & Stockton

(57) ABSTRACT

Systems, methods and devices for computing a mobile device location using network centric location measurements are described. In one potential embodiment, a location method comprises performing a user plane location session between a mobile device and a location server in order to reliably coordinate positioning of the mobile device. Based on the network centric coordination, the location server instructs one or more access points to obtain location measurements for the mobile device. The location server may then locate the mobile device based on the location measurements and possibly any mobile centric location measurements obtained from the mobile device using the user plane location session. The coordination of network centric positioning using the user plane location session may comprise transfer of SUPL and possibly LPP/LPPe positioning messages between the mobile device and location server.

56 Claims, 9 Drawing Sheets

(51) Int. Cl.
*H04W 4/20* (2009.01)
*H04W 64/00* (2009.01)
*G01S 5/02* (2010.01)

(58) Field of Classification Search
USPC ............... 455/456.1, 456.3, 414.1, 404.2
See application file for complete search history.

(56) References Cited

U.S. PATENT DOCUMENTS

| | | |
|---|---|---|
| 8,290,510 B2 | 10/2012 | Thomson et al. |
| 2004/0258012 A1* | 12/2004 | Ishii ............................ 370/328 |
| 2007/0037586 A1 | 2/2007 | Kim et al. |
| 2008/0123608 A1 | 5/2008 | Edge et al. |
| 2008/0268871 A1* | 10/2008 | Kim et al. ................. 455/456.2 |
| 2008/0303901 A1* | 12/2008 | Variyath ................... G01S 5/02 |
| | | 348/143 |
| 2009/0176488 A1 | 7/2009 | Shim |
| 2010/0240392 A1* | 9/2010 | Gerstenberger et al. .. 455/456.1 |
| 2011/0003602 A1* | 1/2011 | Kim et al. ................. 455/456.1 |
| 2011/0110293 A1 | 5/2011 | Hart et al. |
| 2011/0200022 A1 | 8/2011 | Annamalai |
| 2011/0287785 A1* | 11/2011 | Hu .......................... H04W 8/08 |
| | | 455/456.2 |
| 2012/0083288 A1* | 4/2012 | Siomina ..................... 455/456.1 |

\* cited by examiner

SYSTEMS AND METHODS FOR NETWORK CENTRIC WLAN LOCATION OF A MOBILE DEVICE

PRIORITY

The present application claims priority to provisional U.S. Patent Application No. 61/689,931, filed Jun. 15, 2012, entitled "NETWORK BASED WLAN LOCATION USING SUPL AND LPP/LPPE", and to provisional U.S. Patent Application No. 61/789,272 filed on Mar. 15, 2013, entitled "SYSTEMS AND METHODS FOR WIRELESS NETWORK BASED LOCATION MEASUREMENTS", the entire contents of which are herein incorporated by reference for all purposes.

BACKGROUND

Aspects of the disclosure relate to networked computing technologies and location services. In particular, aspects of the disclosure relate to systems, methods, apparatus, and computer readable media for using wireless local area network (WLAN) access points (APs), Secure User Plane Location (SUPL), Long Term Evolution (LTE) positioning protocol (LPP), and/or LPP Extensions (LPPe) to determine the location of a mobile device such as a cellphone, smartphone or laptop.

A WLAN AP may be an AP supporting any of the IEEE 802.11 protocols and may then be referred to as a WiFi AP. A WLAN AP may also or instead support Bluetooth (BT) or some other short range communications technology. A number of methods exist whereby the location of a mobile device nearby to one or more WLAN APs may be obtained. One set of methods which may be designated "mobile centric" are supported by the Secure User Plane Location (SUPL) solution defined by the Open Mobile Alliance (OMA). With this solution, a mobile device detects the identities (IDs) for, and possibly makes measurements of radio signals from, one or more nearby WLAN APs. The detected WLAN AP IDs and optionally the WLAN AP signal measurements are then combined with known locations for the WLAN APs to compute a location estimate for the mobile device either by the mobile device itself or in a SUPL Location Platform (SLP) if the detected WLAN AP IDs and any measurements are transferred by the mobile device to the SLP. With an alternative method (e.g. defined in IEEE 802.11 standards for WiFi APs) which may be designated as "network centric", WLAN APs detect signals from a mobile device and may make measurements of the signals and then compute a location estimate for the mobile device or transfer the measurements to a separate location server to perform the location computation.

Limitations applicable to mobile centric methods such as SUPL may include an inability of a mobile device to make useful measurements of signals received from WLAN APs (e.g. measurements of round trip signal propagation time (RTT)) if such measurements require certain actions from WLAN APs (e.g. as defined in IEEE 802.11 standards) and these actions are not supported by WLAN APs or not provided by WLAN APs to a particular mobile device. Further limitations may include reliance on measurements made just by the mobile device which may be less accurate (and less reliable) than measurements made by WLAN APs which may be at several different locations and may be considered more trustworthy by a network operator. In addition, a mobile device may measure signals from WLAN APs that lie predominantly in one direction as seen from the mobile device due to stronger signal reception from this direction (e.g. such as when a mobile device measures signals from WLAN APs that are in or near to a corridor in a building when the mobile device is at one end of the corridor). As is known in the art, using measurements such as signal strength, RTT or Time Difference Of Arrival (TDOA) for signals coming from approximately the same direction may significantly magnify measurement errors due to poor geometry resulting in a less accurate location estimate compared to the case where a mobile device measures WLAN AP signals from several or many different directions.

Limitations applicable to network centric methods such as those defined for a WiFi AP by IEEE 802.11 standards may include an unwillingness by a mobile device to participate (to the extent demanded by any method) if the mobile device is unwilling to be located for the benefit of some unknown (and thus not trusted) external client. A further limitation may be an inability of a WLAN AP or some location server controlling a WLAN AP to associate a known global identity for a mobile device with an identity or address used for WLAN signaling. For example, with IEEE 802.11 signaling, a mobile device would normally be identified by a 48 bit Media Access Control (MAC) address whereas the same mobile device may be identified for cellular communications using an International Mobile Subscriber Identity (IMSI) containing up to 15 decimal digits or an International Mobile Equipment Identity (IMEI) containing 15 decimal digits. Any location obtained for a mobile device may then be associated with the mobile device MAC address but not with the mobile device IMSI or IMEI in which case the location may not be available to a client that requests the mobile device location using the IMSI or IMEI. A yet further limitation may be that a mobile device does not receive or ignores location requests from nearby WLAN APs and/or that WLAN APs remote from a mobile device are mistakenly requested by a location server to locate the mobile device.

Due to the limitations of existing mobile centric and network centric location methods associated with locating a mobile device nearby to one or more WLAN APs, there may be an advantage in other methods of locating a mobile device in such scenarios.

BRIEF SUMMARY

Various systems methods, apparatus, and computer readable media for using wireless local area network (WLAN) access points (APs), Secure User Plane Location (SUPL), Long Term Evolution (LTE) positioning protocol (LPP), and/or LPP Extensions (LPPe) to determine the location of a mobile device such as a cellphone, smartphone or laptop are provided.

For example, one potential embodiment may comprise a method of locating a mobile device. Such a method may comprise a series of steps including performing a user plane location session between the mobile device and a location server; communicating positioning information between the mobile device and the location server via the user plane location session; communicating from the location server to at least one access point, an instruction to initiate a network centric location measurement for the mobile device wherein the instruction is based at least in part on the communicated positioning information; receiving from the at least one access point, results of the network centric location measurement; and determining a location of the mobile device based, at least in part, on the results of the network centric location measurement.

Additional embodiments of such a method may function where the communicated positioning information comprises a parameter related to mobile device support of network centric location measurement by the at least one access point. Additional embodiments of such a method may function where the communicated positioning information comprises a location server request and a mobile device confirmation for the network centric location measurement by the at least one access point. Additional embodiments of such a method may function where the location server comprises a Secure User Plane Location (SUPL) Location Platform (SLP) and wherein the mobile device comprises a SUPL enabled terminal (SET).

Still further additional embodiments of such a method may function where the communicated positioning information is contained in at least one SUPL User Plane Location Protocol (ULP) parameter. Additional embodiments of such a method may function where the communicated positioning information is contained in at least one Long Term Evolution (LTE) Positioning Protocol (LPP) Extensions (LPPe) parameter. Additional embodiments of such a method may function where the at least one LPPe parameter is contained in at least one of an LPP/LPPe Request Location Information message and an LPP/LPPe Provide Location Information message.

Additional embodiments of such a method may function where communicating from the location server to the at least one access point the instruction to initiate the network centric location measurement for the mobile device further comprises: identifying a plurality of access points within range of the mobile device; and coordinating, by the location server, network centric location measurements of the mobile device from each access point of the plurality of access points.

Additional embodiments of such a method may function where the network centric location measurement comprises at least one of a Time Difference of Arrival (TDOA), Round Trip Time (RTT), signal strength and signal to noise ratio. Additional embodiments of such a method may function where the network centric location measurement comprises TDOA measurements obtained according to an IEEE 802.11 location track procedure.

Additional embodiments of such a method may function where performing the user plane location session between the mobile device and a Secure User Plane Location (SUPL) Location Platform (SLP) comprises receiving a least one of a SUPL START message and a SUPL POS INIT message at the SLP from the mobile device wherein the at least one SUPL START message and the SUPL POS INIT message comprises a ULP parameter indicating SET capabilities to support the network centric location measurement by the at least one access point.

Additional embodiments of such a method may further comprise receiving from the mobile device a mobile centric location result, where the mobile centric location result is received using the user plane location session; and determining a location of the mobile device based on the results of the network centric location measurement and the mobile centric location result. Additional embodiments of such a method may function where the mobile centric location result comprises at least one of a location estimate and a signal measurement for at least one access point, navigation satellite or cellular base station.

Another potential embodiment may be a location server comprising a memory; and a processor coupled to the memory; and an output device coupled to the processor; wherein the processor is configured to: perform a user plane location session between a mobile device and the location server; communicate positioning information between the mobile device and the location server via the user plane location session; communicate from the location server to at least one access point, an instruction to initiate a network centric location measurement for the mobile device wherein the instruction is based at least in part on the communicated positioning information; receive from the at least one access point, results of the network centric location measurement; and determine a location of the mobile device, based at least in part, on the results of the network centric location measurement.

Additional embodiments of such a location server may function where the location server comprises a Secure User Plane Location (SUPL) Location Platform (SLP) and wherein the mobile device comprises a SUPL enabled terminal (SET). Additional embodiments of such a location server may function where the communicated positioning information is contained in at least one Long Term Evolution (LTE) Positioning Protocol (LPP) Extensions (LPPe) parameter. Additional embodiments of such a location server may function where the at least one LPPe parameter is contained in at least one of an LPP/LPPe Request Location Information message and an LPP/LPPe Provide Location Information message.

Another embodiment may be a non-transitory computer readable medium comprising computer readable instructions that, when executed by a processor, cause a location server to perform a method of locating a mobile device, the method comprising: performing a user plane location session between the mobile device and the location server; communicating positioning information between the mobile device and the location server via the user plane location session; communicating from the location server to at least one access point, an instruction to initiate a network centric location measurement for the mobile device wherein the instruction is based at least in part on the communicated positioning information; receiving from the at least one access point, results of the network centric location measurement; and determining a location of the mobile device based, at least in part, on the results of the network centric location measurement.

Another embodiment of such a non-transitory computer readable medium may function where the method further comprises: receiving a first set of location measurements from a first access point; and receiving a second set of location measurements from a second access point; wherein determining the location of the mobile device comprises calculating, by the processor, the location of the mobile device using a first known location of the first access point, a second known location of the second access point, the first set of location measurements, and the second set of location measurements.

Another embodiment of such a non-transitory computer readable medium may function where the location server comprises a Secure User Plane Location (SUPL) Location Platform (SLP) and wherein the mobile device comprises a SUPL enabled terminal (SET). Another embodiment of such a non-transitory computer readable medium may function where the communicated positioning information is contained in at least one SUPL User Plane Location Protocol (ULP) parameter.

Another embodiment may be a location server comprising: means for performing a user plane location session between a mobile device and the location server; means for communicating positioning information between the mobile device and the location server via the user plane location session; means for communicating from the location server to at least one access point, an instruction to initiate a network centric location measurement for the mobile device wherein the instruction is based at least in part on the communicated positioning information; means for receiving from the at least one access point, results of the network centric location measurement; and means for determining a location of the mobile device based, at least in part, on the results of the network centric location measurement.

Another embodiment of such a location server may comprise means for identifying a requesting external client to the mobile device and receiving authorization from a user of the mobile device to locate the mobile device. Another embodiment may be a method comprising performing a user plane location session between the mobile device and a location server; communicating positioning information between the mobile device and the location server via the user plane location session; and receiving, at the mobile device, a communication from at least one access point as part of a network centric location measurement for the mobile device, wherein the communication from the at least one access point is based, at least in part, on the communicated positioning information.

Further embodiments of such a method may further comprise receiving, at the mobile device, a location of the mobile device from the location server as determined by the location server based, at least in part, on the network centric location measurement. Further embodiments of such a method may function where the network centric location measurement comprises at least one of a round trip time measurement, a time difference of arrival measurement, a received signal strength measurement and a signal to noise ratio measurement. Further embodiments of such a method may function where the communicated positioning information comprises a parameter related to the mobile device support of the network centric location measurement from the at least one access point.

Further embodiments of such a method may function where the communicated positioning information comprises a location server request and a mobile device confirmation for the network centric location measurement from the at least one access point. Further embodiments of such a method may function where the location server comprises a Secure User Plane Location (SUPL) Location Platform (SLP) and wherein the mobile device comprises a SUPL enabled terminal (SET).

Further embodiments of such a method may function where the communicated positioning information is contained in at least one SUPL User Plane Location Protocol (ULP) parameter. Further embodiments of such a method may function where the communicated positioning information is contained in at least one Long Term Evolution (LTE) Positioning Protocol (LPP) Extensions (LPPe) parameter. Further embodiments of such a method may function where the at least one LPPe parameter is contained in at least one of an LPP/LPPe Request Location Information message and an LPP/LPPe Provide Location Information message.

Another embodiment may be a mobile device comprising a memory; and a processor coupled to the memory; wherein the processor is configured to: perform a user plane location session between the mobile device and a location server; communicate positioning information between the mobile device and the location server via the user plane location session; and receive, at the mobile device, a communication from at least one access point as part of a network centric location measurement for the mobile device, wherein the communication from the at least one access point is based, at least in part, on the communicated positioning information. Such a mobile device may further function where the processor is further configured to receive the location of the mobile device from the location server as determined by the location server based on the network centric location measurement. Such a mobile device may further function where the communication from the at least one access point comprises a request to initiate at least one of an IEEE 802.11 location track procedure and an IEEE 802.11 timing measurement procedure.

Another embodiment may be a mobile device comprising means for performing a user plane location session between the mobile device and a location server; means for communicating positioning information between the mobile device and the location server via the user plane location session; and means for receiving, at the mobile device, a communication from at least one access point as part of a network centric location measurement for the mobile device, wherein the communication from the at least one access point is based, at least in part, on the communicated positioning information.

Such a mobile device may further include means for receiving, at the mobile device, a location of the mobile device from the location server as determined by the location server based, at least in part, on the network centric location measurement. Such a mobile device may further include means for performing at least one of a plurality of round trip time measurements and a plurality of time difference of arrival measurements from the mobile device to at least two access points including the at least one access point, within a predetermined time window. Such a mobile device may further include means for reporting a mobile centric location result to the location server using the user plane location session. Such a mobile device may further function where the mobile centric location result comprises at least one of a location estimate and a signal measurement for at least one access point, navigation satellite or cellular base station.

Another embodiment may be a non-transitory computer readable medium comprising computer readable instructions that, when executed by a processor, cause a mobile device to perform a method of locating the mobile device, the method comprising performing a user plane location session between the mobile device and a location server; communicating positioning information between the mobile device and the location server via the user plane location session; and receiving, at the mobile device, a communication from at least one access point as part of a network centric location measurement for the mobile device, wherein the communication from the at least one access point is based, at least in part, on the communicated positioning information.

Such a non-transitory computer readable medium may function where the method further comprises receiving, at the mobile device, a location of the mobile device from the location server as determined by the location server based, at least in part, on the network centric location measurement. Such a non-transitory computer readable medium may function where the method further comprises performing at least one of a plurality of round trip time measurements and a plurality of time difference of arrival measurements from the mobile device to at least two access points including the at least one access point, within a predetermined time window.

Another embodiment may be a method of locating a mobile device comprising receiving, at an access point, a communication from a location server authorizing a network centric location measurement of the mobile device as part of a secure user plane location (SUPL) session between the location server and the mobile device; initiating, by the access point, the network centric location measurement for the mobile device, wherein the communication is based at least in part on positioning information communicated between the mobile device and the location server as part of the SUPL session between the location server and the mobile device; and communicating to the location server, results of the network centric location measurement.

Such a method may further function where the communication from the location server authorizing the network centric location measurement comprises a parameter related to mobile device support of the network centric location measurement. Such a method may further function where the parameter identifies that the mobile device supports round trip time location measurements. Such a method may further function where the parameter identifies that the mobile device supports time difference of arrival measurements.

Another embodiment may be an access point comprising: an antenna; a memory coupled to the antenna; and a processor coupled to the antenna and the memory; wherein the processor is configured to receive, at the access point, a communication from a location server authorizing a network centric location measurement of a mobile device as part of a secure user plane location (SUPL) session between the location server and the mobile device; initiate, by the access point, the network centric location measurement for the mobile device, wherein the communication is based at least in part on positioning information communicated between the mobile device and the location server as part of the SUPL session between the location server and the mobile device; and communicate to the location server, results of the network centric location measurement.

Such an access point may further function where the memory comprises a location of the access point, and wherein the access point communicates the location of the access point to the location server along with the results of the network centric location measurement. Such an access point may further function where the processor is further configured to communicate a set of location configuration request frames to the mobile device prior to initiating the network centric location measurement.

Another embodiment may be an access point comprising means for receiving, at the access point, a communication from a location server authorizing a network centric location measurement of a mobile device as part of a secure user plane location (SUPL) session between the location server and the mobile device; means for initiating, by the access point, the network centric location measurement for the mobile device, wherein the communication is based at least in part on positioning information communicated between the mobile device and the location server as part of the SUPL session between the location server and the mobile device; and means for communicating to the location server, results of the network centric location measurement.

Another embodiment of such an access point may further comprise means for obtaining at least one of a round trip time to the mobile device and a time difference of arrival for the mobile device. Another embodiment of such an access point may further comprise means for verifying, by the access point, the communication from the location server authorizing the network centric location measurement.

Another embodiment may be a non-transitory computer readable medium comprising computer readable instructions that, when executed by a processor, cause an access point to perform a method of locating a mobile device, the method comprising receiving, at the access point, a communication from a location server authorizing a network centric location measurement of the mobile device as part of a secure user plane location (SUPL) session between the location server and the mobile device; initiating, by the access point, the network centric location measurement for the mobile device, wherein the communication is based at least in part on positioning information communicated between the mobile device and the location server as part of the SUPL session between the location server and the mobile device; and communicating to the location server, results of the network centric location measurement.

Further embodiments of such a non-transitory computer readable medium may function where the method further comprises initiating, by the access point, a second network centric location measurement; and communicating to the location server, results of the second network centric location measurement. Further embodiments of such a non-transitory computer readable medium may function where the method further comprises receiving, at the access point, additional location results associated with the mobile device from the mobile device independent of the network centric location measurement; and communicating the additional location results from the access point to the location server.

Although specific embodiments are described herein to illustrate various potential implementations, it will be understood that additional alternatives are possible while remaining within the scope of the innovations presented herein.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
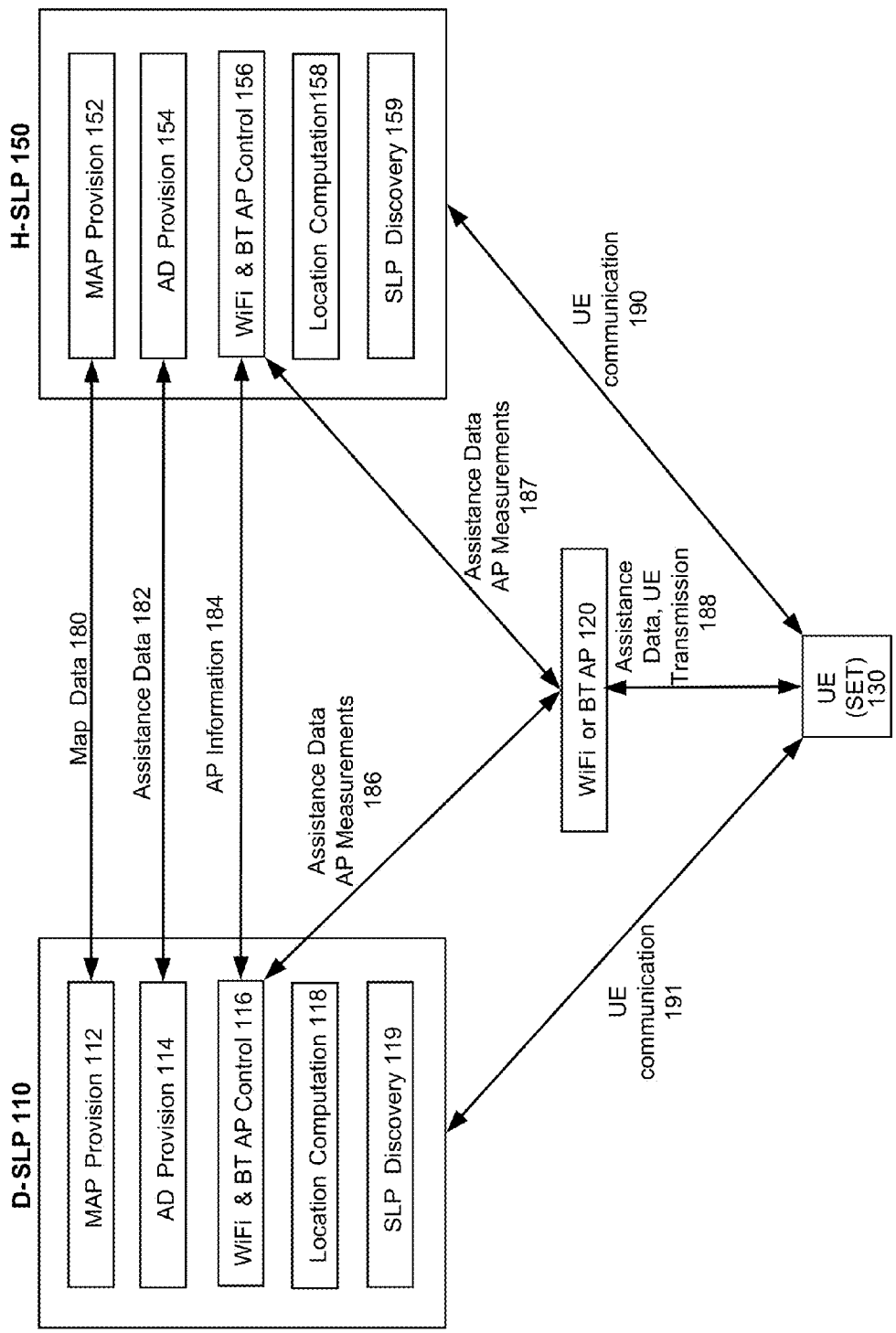
FIG. 1 is a system diagram illustrating a system for use with embodiments of the innovations presented herein.

Embodiments described herein relate to methods to determine a location of a mobile device (e.g. cellular phone or other mobile computing device) that is in the vicinity of one or more wireless local area network (WLAN) access points (APs). Aspects of the disclosure relate to WLAN APs, Secure User Plane Location (SUPL) Location Platform (SLP) servers, Long Term Evolution (LTE) positioning protocol (LPP) and/or LPP Extensions (LPPe) to determine the location of a mobile device.

I. Overview of Mobile Device Location Services According to Various Embodiments

Existing technologies relating to WLAN positioning may have issues with access point support of mobile device location services, and embodiments described herein address certain problems with access point control using a location server that is trusted by a mobile computing device, for example to coordinate measurements from nearby access points to enable improved location services.

Terms recited herein may be used to encompass functionality or features as described below. Other functionality and/or features may instead or additionally be utilized in some embodiments.

The Secure User Plane Location (SUPL) solution is a user plane location solution defined by the Open Mobile Alliance (OMA) that uses internet protocol (IP) based technology to support location based services related to mobile devices. One focus of the SUPL solution is providing assistance data (AD) to a mobile device whose location is needed (e.g. by an application on the mobile device or by some external client) to assist the mobile device to make suitable location related measurements and, in some cases, to compute its location using such measurements. While there are a variety of ways to provide location assistance data to a mobile device, SUPL provides a standardized environment with a simple client server model together with standardized protocols defining interaction between a SUPL location server, known as a SUPL Location Platform (SLP) and a mobile device, known as a SUPL Enabled Terminal (SET). The SUPL solution also supports the conveyance of a location estimate from a SET to an SLP, the conveyance of location related measurements from a SET to an SLP when the SLP rather than SET will compute the SET's location and the exchange of SUPL capabilities and other positioning capabilities between a SET and an SLP. SUPL can, in addition, support various service related features that enhance simple positioning such as obtaining SET location estimates on a triggered or periodic basis and obtaining historic SET locations. The various capabilities supported by SUPL may significantly improve location support for mobile devices and may enable more accurate and reliable location of a mobile device in comparison to methods that rely on simple standalone positioning support in a mobile device based on measurements of, for example, the US Global Positioning System (GPS).

In devices that make use of SUPL services, the standard implementation involves a mobile device being assigned a fixed single home SLP (H-SLP) with the H-SLP being associated with either a home operator for the mobile device or some other preferred provider of location services. A mobile device uses provisioned information for the H-SLP, which either is or includes the H-SLP address, to establish a connection with the device's H-SLP when engaging in a SUPL location session. Information about additional local devices (e.g. wireless base stations and WiFi APs whose signals may be received by the mobile device and used to help locate the mobile device) may then be accessed via the H-SLP in the form of assistance data transferred from the H-SLP to the mobile device. SUPL also defines more localized SLPs, known as Discovered SLPs (D-SLPs), that may in some scenarios provide more extensive and appropriate information (e.g. better assistance data) to a device than its H-SLP. For example, when a mobile device is roaming in a distant location from its H-SLP or is at a location (e.g. inside a building or at a venue) for which its H-SLP has little or no information, a D-SLP nearby to the mobile device (e.g. associated with the same building or venue within which the mobile device is located) may be able to provide assistance data containing information for more base stations and access points local to the mobile device than the mobile device's H-SLP. This additional information may enable improved location support based on the mobile device acquiring and measuring signals from these additional base stations and access points.

An H-SLP provider may negotiate with a D-SLP provider to allow a SET (i.e. SUPL capable mobile device) subscriber of the H-SLP to have access to the D-SLP as part of a business relationship between the H-SLP provider and the D-SLP provider. When a SET discovers that it is in a location with a D-SLP, the SET may query its H-SLP for authorization to access the D-SLP for location services through an authorization process. If access to the D-SLP is authorized by the H-SLP, the SET may then access the D-SLP to obtain location services such as receiving assistance data to support location determination or sending location measurements to the D-SLP for the D-SLP to compute a location estimate and return it to the SET. In some scenarios, a SET may be in some local area (e.g. inside a venue such as a shopping mall, airport, hospital, college campus, library or museum) where adequate location support is not possible from its H-SLP but where the SET is not aware of a particular D-SLP that may provide better location services. In such a scenario, a SET may query its H-SLP to provide the address of some D-SLP authorized by the H-SLP to provide location services for the SET in the current local area. In such a query interaction, the H-SLP may supply both the address of a D-SLP and authorization to access the D-SLP in the same interaction.

The SUPL location solution is based on interaction between a SET and an SLP using the Transmission Control Protocol (TCP) and IP as a transport mechanism in which SUPL messages, defined according to the SUPL User Plane Location Protocol (ULP), are exchanged between the SET and the SLP to set up and manage SUPL location sessions and to transport needed assistance data, location information (e.g. location estimate and/or location measurements) and SUPL positioning capabilities. A SUPL session may typically employ one or more positioning protocols that are separate from the SUPL ULP protocol and may convey some or all of the assistance data transferred from an SLP to a SET and some or all of the location measurements and/or location estimates transferred from the SET to the SLP. Typically, certain SUPL messages (e.g., a SUPL POS message) may carry one or more embedded messages defined according to a positioning protocol as a means of invoking and supporting positioning within a SUPL session. Examples of positioning protocols supported by SUPL include Radio Resource Location Services (LCS) Protocol (RRLP), Radio Resource Control (RRC), LTE Positioning Protocol (LPP), IS-801 and LPP Extensions (LPPe). Typically, LPPe may not be used in isolation but only to extend LPP such that an LPP positioning protocol message may contain an embedded LPPe message. Thus, whenever LPPe is used, LPP may also be used and the combined protocol may be referred to as LPP/LPPe. RRLP, RRC and LPP are defined by an organization known as the 3rd Generation Partnership Project (3GPP), IS-801 is defined by an organization known as the 3rd Generation Partnership Project 2 (3GPP2) and LPPe is defined by OMA, all in publicly available documents. The terms location, location estimate, position and position estimate are used interchangeably herein and refer to a location of a mobile device which may be expressed in absolute terms (e.g. using latitude, longitude and possibly altitude coordinates), or in a civic form (e.g. as a postal address) or in relative terms (e.g. as a distance and direction from some other known location).

A mobile device or SET may be referred to as a User Equipment (UE), mobile terminal, terminal, wireless device, device, mobile station or by some other name. Possible examples of a SET are cellphones, smartphones, laptops, tablets or any IP enabled direction providing electronics, though any computing device with location services may function as a SET in various embodiments described herein. Typically a SET will support wireless communications using such radio technologies as Global System for Mobile Communications (GSM), Code Division Multiple Access (CDMA), Wideband CDMA (WCDMA), Long Term Evolution LTE), High Rate Packet Data (HRPD) and IEEE 802.11 WiFi. GSM, WCDMA and LTE are technologies defined by 3GPP. CDMA and HRPD are technologies defined by 3GPP2. A SET may also or instead support wireline communication using broadband access from a Local Area Network (LAN) or using Packet Cable or DSL.

An access point (AP) may refer to any transmission point that communicates with a nearby mobile device according to any number of IEEE standards (for example one or more of the 802.11 standards) or using Bluetooth or other short range wireless technologies. It may be appreciated that while many of the embodiments of the method described herein refer to WiFi APs and use of WiFi (e.g. IEEE 802.11) positioning procedures, the method may be equally applicable to other types of AP and short range communication technologies such as Bluetooth. Moreover, while SUPL is used as an exemplary location solution for a UE involving a location server (or SLP) in direct communication with the UE using the SUPL ULP protocol, the method here may be applicable to any other location solution for a UE in which a location server is used that positions a UE via direct communication between the location server and UE.

In certain embodiments, a local D-SLP may have improved local information as compared with an H-SLP due to being owned or operated in association with a building owner or venue owner who has access to information such as building floor plans, layout of a campus and/or placement of APs and base stations that are not so easily accessible to the provider of an H-SLP. One example of this may be specific information related to the characteristics (e.g. WiFi radio interface types and WiFi AP addresses) and placements (e.g. relative or absolute location coordinates) of local WLAN APs within a building or venue. WLAN APs may be used in conjunction with SUPL and an SLP to support location of a mobile device. Those of skill in the art will appreciate that while the term WLAN AP is used to describe certain embodiments, this term does not limit the scope of these embodiments. Rather, these embodiments may utilize any local area or wide area signaling and protocols in certain implementations. For example, LTE or WCDMA may be utilized in certain embodiments instead of or in addition to WLAN signaling such as WiFi or BT. In addition, cellular base stations, such as Femtocells or home base stations, may be used in place of WLAN APs.

Two ways in which WLAN APs may be used to support location of a mobile device are described below. One way, referred to as "mobile centric", is for a mobile device (e.g. UE) to measure signals from one or more APs—e.g. obtain the MAC addresses of nearby APs, signal strength and possibly round trip time (RTT) to an AP. The other method, referred to as "network centric" is for WiFi APs to measure signals (e.g. IEEE 802.11 frames) transmitted by a UE. The signal measurements obtained by a WiFi AP or by a number of WiFi APs may then be used to determine the location of the UE based on a known location for each of the WiFi APs. The location determination may be performed by a WiFi AP or by some server (e.g. a location server) that is in communication with the one or more WiFi APs. The determined location may then be provided to the mobile device or to some external client or may just be stored for future use—e.g. to be provided later to some external client if there is a later request. This network centric method has been enabled in the IEEE 802.11v standard for WiFi APs via several procedures in which a WiFi AP sends a control frame to the mobile device to instruct the mobile device to return one or more frames to the AP whose arrival times are then measured by the AP and possibly also by other nearby APs. There are numerous issues with certain embodiments of such an approach. Some of these issues are described below. It will be appreciated, however, that certain implementations of the location methods described above may not suffer from issues described below.

The first issue relates to security and privacy. A UE may not know the final recipient of its location (e.g. the identity of any external client to which its location may be provided), and privacy may be compromised when undesired parties receive this information. A second problem is reliability. While the AP will know the media access control (MAC) address of the UE in case of WiFi signaling it may not know the UE global identity (e.g. the IMSI or IMEI of the UE). This means that it may not be possible to match a determined location for the UE associated with the UE MAC address with a request from some external client for the location of the UE that identifies the UE using an IMSI, IMEI or other global identity that is not the MAC address. A third problem concerns overall feasibility, since a UE may not even be receiving an AP transmission unless there is already an association with the AP. Any AP whose signaling is not being received by a UE will not be able to induce signaling from the UE (e.g. induce a response frame after sending a command frame) and will thus be unable to invoke different standardized location procedures as defined for example by IEEE 802.11v. A fourth problem is that a UE and AP must both support the relevant 802.11 IEEE standard procedure in some embodiments, and be unable to support location determination if the UE and AP do not both support the same standard procedure. A fifth problem is that coordination on the network side may be difficult since any AP that invokes a location procedure with a UE may need to coordinate measurement of frames sent by the UE with other nearby APs which may be problematic in the absence of a control structure or control hierarchy. This fifth problem may be further compounded in systems that support hybrid mobile centric and network centric location of a UE, since it may be difficult to effectively combine the WiFi AP measurements obtained using network centric location with other measurements made by the UE that were returned to a location server with mobile centric location. Finally, a sixth problem may arise for UE requested location. In this case, a UE may request a location server to determine and provide the UE location to the UE, but the location server may not know the WiFi AP positioning procedures supported by the UE (e.g. procedures standardized in IEEE 802.11v) or the identities of the particular WiFi APs nearby to the UE that can perform these procedures and obtain the UE location using network centric positioning.

To circumvent the above problems, control of WiFi AP network centric location may be vested in a location server trusted by the UE, such as an H-SLP or an authorized D-SLP. The trusted SLP may communicate location information and instructions for particular WiFi network centric location procedures to the UE using SUPL or LPP/LPPe and then coordinate measurements from one or more nearby APs. For example, the UE may first provide the trusted SLP with the identities (e.g. MAC addresses) of nearby WiFi APs whose signals have been received by the UE together with an indication of the network centric WiFi positioning procedures (e.g. standardized in IEEE 802.11v) that the UE supports. The trusted SLP may then decide which WiFi network centric positioning procedure(s) it will invoke and which WiFi APs will be used to support these procedures and inform the UE which procedure(s) will be used and which WiFi AP(s) will be used to invoke the procedure(s) with the UE. The trusted SLP may also provide an indication to the UE of some future time at which the procedure(s) will be invoked. In the case that no time indication is provided, a UE could assume that invocation will occur at the current time. At the indicated time, the UE may then monitor signaling from the indicated WiFi AP(s) and respond to any location commands received from the indicated WiFi AP(s)—e.g. by returning one or more responses whose times of arrival could be measured by the WiFi APs in some embodiments. A trusted SLP could also itself request a UE to perform certain WiFi signaling (e.g. transmit certain WiFi IEEE 802.11 frames) at a particular time that could be measured by one or more WiFi APs which may avoid the need for such UE WiFi signaling to be invoked by a WiFi AP. Such trusted SLP invocation of UE WiFi signaling may reduce the amount of WiFi signaling that needs to be supported by a UE and WiFi AP compared to the IEEE 802.11v standard procedures.

The solution above may solve various problems highlighted earlier. The first problem concerning security may be resolved, for example because the UE will know that location is being requested and coordinated by a trusted entity (e.g. a trusted SUPL D-SLP or H-SLP) that can make use of existing SUPL privacy and security capabilities—e.g. when sending location information and instructions to the UE using SUPL to invoke WiFi network centric positioning. The second problem concerning reliability may be mitigated, for example, because the trusted SLP may know the UE global identity (e.g. which may be configured in an H-SLP when a UE initially subscribes to SUPL location services or may be provided by a UE to an authorized D-SLP) and may obtain the UE MAC address directly from the UE in any SUPL positioning session where WiFi network centric location is used. A trusted SLP may thus associate the UE global address with the UE MAC address and thereby associate a location request from an external client that specifies the UE global address with a network centric obtained location for the UE associated with the UE MAC address. Further, an SLP may be able to communicate with a UE using IP if the UE IP address is known (e.g. from association in a serving network or home network with a UE global identity or from receipt of a previous UE IP transported message) or using Short Message Service (SMS) or Session Initiation Protocol (SIP) in other cases. A trusted SLP may therefore be able to instigate WiFi network centric positioning in a UE without necessarily waiting for WiFi APs to detect and report the presence of the UE to the SLP.

The third problem above concerning overall feasibility may not arise because the trusted SLP may often be able to communicate with the UE (e.g. via IP, SMS or SIP signaling) and indicate to the UE which WiFi APs (if any) the UE needs to receive transmissions from. The fourth problem concerning the need for common support of WiFi network centric positioning procedures by both APs and the UE can be mitigated if the UE can at least transmit WiFi frames in response to instructions (e.g. received via SUPL or LPP/LPPe) from a trusted SLP. In this case, the UE and APs may not need to engage in a complete WiFi network centric (e.g. IEEE 802.11v) positioning procedure but instead support a shorter truncated version of such a procedure in which instructions are provided by a trusted server (e.g. SLP) to both the UE and WiFi APs with WiFi APs then measuring WiFi frames transmitted by the UE. For other procedures where a WiFi AP command is needed as part of the measurement procedure (e.g. to determine RTT), the trusted SLP can at least verify in advance whether the UE supports the procedure. The fifth problem of coordination on the network side may be resolved by having the trusted SLP coordinate actions by both the UE and involved WiFi APs. The trusted SLP can further instigate both network centric WiFi positioning and mobile centric positioning (e.g. using SUPL) in order to obtain a more accurate and/or reliable location using location results from both methods. The sixth problem concerning a UE requested location may be resolved if the UE sends this location request to a trusted SLP which may then invoke network centric or mobile centric positioning or both to obtain the UE location.

II. Embodiments of Systems for Network Based WiFi Location Services

FIG. 1 shows one implementation of a system for network centric WiFi location according to the present innovations. FIG. 1 includes D-SLP 110, H-SLP 150, access point 120, and user equipment 130. D-SLP 110 and H-SLP 150 may include modules to provide a variety of services, as shown such as map provisioning 112 and 152, assistance data (AD) provisioning 114 and 154, access point control 116 and 156, location computation 118 and 158, and support for SLP discovery by a UE 119 and 159.

Each location server such as D-SLP 110 and H-SLP 150 may share information as identified by contracts between different services providers, or to support load sharing if the servers are organized by the same location service provider. If, for example, D-SLP 110 receives an update to map information in MAP provision module 112, it may share map data 180 with H-SLP 150, so that H-SLP 150 may update map provision module 152. Similarly, assistance data 182 may be shared between AD provision modules 114 and 154 (e.g. if either D-SLP 110 or H-SLP 150 obtains new assistance data as a result of crowd sourced information from UEs such as UE 130). AP related information 184 may be transferred between AP control module 116 and AP control module 154 in order to allow one SLP to control, and/or receive measurement information from, APs normally controlled by another SLP (e.g. thereby allowing H-SLP 150 to invoke network centric WiFi positioning for UE 130 using WiFi APs normally under the control of D-SLP 110). Such AP related information 184 may additionally comprise any security passwords or mechanisms associated with particular APs as a location server attempts to use the APs to locate a UE such as UE 130.

Each location server is also shown with location computation modules 118 and 158. Such modules may receive location measurement information from a variety of sources such as UE 130 and/or AP 120, and combine the information to locate UE 130. In a simplest example, location computation module 118 in D-SLP 110 may receive a location of an access point from AD provision module 114 and a distance measurement to UE 130 from access point 120, and may determine a location estimate for UE 130 based on this information. In more complex examples, measurements from multiple access points (not shown in FIG. 1) and/or from UE 130 may be integrated to provide improved accuracy in determining the location of UE 130. Location computation module 158 in H-SLP 150 may perform the same or similar functions.

To further support location of a UE 130, D-SLP 110 (e.g. AP control module 116 in D-SLP 110) and H-SLP 150 (e.g. AP control module 156 in H-SLP 150) may transfer assistance data to one or more WiFi and/or BT APs (e.g. to WiFi or BT AP 120) via communication links 186 and 187, respectively. WiFi and/or BT APs (e.g. AP 120) may subsequently transfer the assistance data to recipient UEs such as UE 130 via broadcast and/or point to point means via communications link 188 which may be supported using WiFi or BT radio signaling. The assistance data may be used by UE 130 to support mobile centric positioning. For example, the assistance data may contain addresses (e.g. WiFi MAC addresses) and location coordinates for WiFi and/or BT APs (e.g. AP 120) which may be used by any recipient UE (e.g. UE 130) to assist the UE to determine its location.

A UE 130 may also be in communication with D-SLP 110 or H-SLP 150 via communication link 191 or 190, respectively. Communications link 191 or 190 may support a SUPL positioning session between UE 130 and D-SLP 110 or H-SLP 150, respectively, whose purpose is to obtain the current location of UE 130 on behalf of UE 130 or D-SLP 110 or H-SLP 150. Signaling messages for the SUPL session may be transported on communications link 191 or 190 via a WiFi or BT AP, such as AP 120, and/or via other entities not shown in FIG. 1 such as a cellular base station, a cellular core network, routers and/or the Internet. Signaling messages for the SUPL session may transfer (i) assistance data and/or map data to UE 130 from D-SLP 110 or H-SLP 150 (e.g. assistance data containing the address and location coordinates for AP 120 and/or map data showing the location of AP 120 on a map and/or AP 120 signal strength at different locations on a map), (ii) location measurements (e.g. measurements of signaling received from AP 120) and/or a location estimate from UE 130 to D-SLP 110 or H-SLP 150, and/or (iii) information enabling UE 130 to discover and obtain service from D-SLP 110.

In FIG. 1, a SUPL session between UE 130 and D-SLP 110 or H-SLP 150 (supported by communications link 191 or 190, respectively) may be used by D-SLP 110 or H-SLP 150 to coordinate WiFi or BT network centric location of UE 130 whereby measurements of UE 130 are made by WiFi or BT APs, such as AP 120, and returned to D-SLP 110 or H-SLP 150 which may use the measurements to determine the location of UE 130. In this case, UE 130 may use the SUPL session to provide D-SLP 110 or H-SLP 150 with the addresses of WiFi or BT APs visible to UE 130 that may be used to obtain the WiFi or BT location measurements of UE 130. UE 130 may also use the SUPL session to provide D-SLP 110 or H-SLP 150 with its own WiFi or BT address such as its MAC address in the case of WiFi. D-SLP 110 or H-SLP 150 may use the SUPL session to inform UE 130 of the WiFi or BT measurements to be obtained, the identities (e.g. MAC addresses) of the APs that will obtain the measurements and/or any WiFi or BT related transmission from UE 130 that may be needed to enable the measurements. D-SLP 110 or H-SLP 150 may also use communications link 186 or 187, respectively, to instruct WiFi or BT APs such as AP 120 to perform location measurements of UE 130 and may provide the WiFi or BT APs with the WiFi or BT address of UE 130 (e.g. the WiFi MAC address of UE 130) so that measurements can be made of the correct UE (i.e. UE 130 and not some other UE). The measurements may include the received signal strength from UE 130 and/or the round trip signal propagation time to and from UE 130. WiFi and BTs APs such as AP 120 may then return the obtained location measurements to D-SLP 110 or H-SLP 150 via communications link 186 or 187, respectively. D-SLP 110 or H-SLP 150 may then compute a network centric location estimate for UE 130 based on these returned measurements. In some implementations, D-SLP 110 or H-SLP 150 may also instigate mobile centric location measurements by UE 130 using the SUPL session referred to above. The mobile centric location measurements may include measurement of signals received by UE 130 from nearby WiFi or BT APs such as AP 120 and may include the received signal strength and/or round trip signal propagation time. The measurements may also include signal measurements of cellular base stations and/or navigation satellites (not shown in FIG. 1) such as navigation satellites for GPS, the Russian Glonass system and/or the European Galileo system. UE 130 may then return the mobile centric location measurements or a location estimate derived by UE 130 from these measurements to D-SLP 110 or H-SLP 150 using the SUPL session. D-SLP 110 or H-SLP 150 may then combine the network centric location measurements received from WiFi or BT APs such as AP 120 with the mobile centric location measurements or location estimate received from UE 130 to obtain a location for UE 130 in a hybrid manner. Information (e.g. information or location measurements for AP 120) that is conveyed between D-SLP 110 or H-SLP 150 and UE 130 using a SUPL session as described above may be carried within the SUPL ULP protocol or may be carried by a positioning protocol such as LPP or LPPe whose messages are contained within SUPL ULP messages. Thus, impacts to support network centric WiFi or BT positioning according to the method described herein may be confined to SUPL ULP message or may be confined to LPP or LPPe messages or may affect messages for both SUPL ULP and LPP and/or LPPe.

As mentioned above, the IEEE 802.11v standard defines several methods of locating a UE via interaction between a WiFi AP such as AP 120 and the UE 130. In such systems, the WiFi AP sends a control frame to the UE to instruct the UE to return one or more frames to the AP whose arrival times are measured by the AP and possibly also by other nearby APs. According to FIG. 1, however, in a system with network centric AP based location, control of AP 120 can be provided by a location server trusted by the UE. Such a trusted server may be H-SLP 150 or authorized D-SLP 110. The trusted SLP then communicates location instructions for AP 120 based location to the UE 130 using SUPL or LPP/LPPe and then coordinates measurements from AP 120.

One location procedure in 802.11v (that may also be considered to be a procedure in the IEEE 802.11 family of standards) is a location track procedure to measure round trip time (RTT) and time difference of arrival (TDOA). Such a procedure may be instigated by a WiFi AP with the UE then sending location track notification frames to nearby WiFi APs containing UE measurements related to the instigating WiFi AP. The arrival times of location track notification frames may then be measured by the instigating AP to obtain RTT and by other APs to obtain TDOAs. If a UE indicates a particular associated AP to an SLP, the SLP can instruct this AP to instigate the location track procedure and instruct other APs to also perform measurements and report results to the SLP. Another 802.11v location procedure (that may also be considered to be a procedure in the IEEE 802.11 family of standards) is a timing measurement procedure. This may be instigated by a WiFi AP to measure RTT and/or to measure a clock offset between the UE and the AP. If a UE indicates an associated AP to an SLP, the SLP can instruct this AP to instigate the timing measurement procedure and report the results. For both 802.11v procedures, the SLP may also indicate to the UE (e.g. via SUPL or LPP/LPPe) that the procedure will be instigated and may indicate the particular AP that will instigate the procedure to ensure that the UE will monitor transmission from the AP and provide the requested responses.

Figure 2:
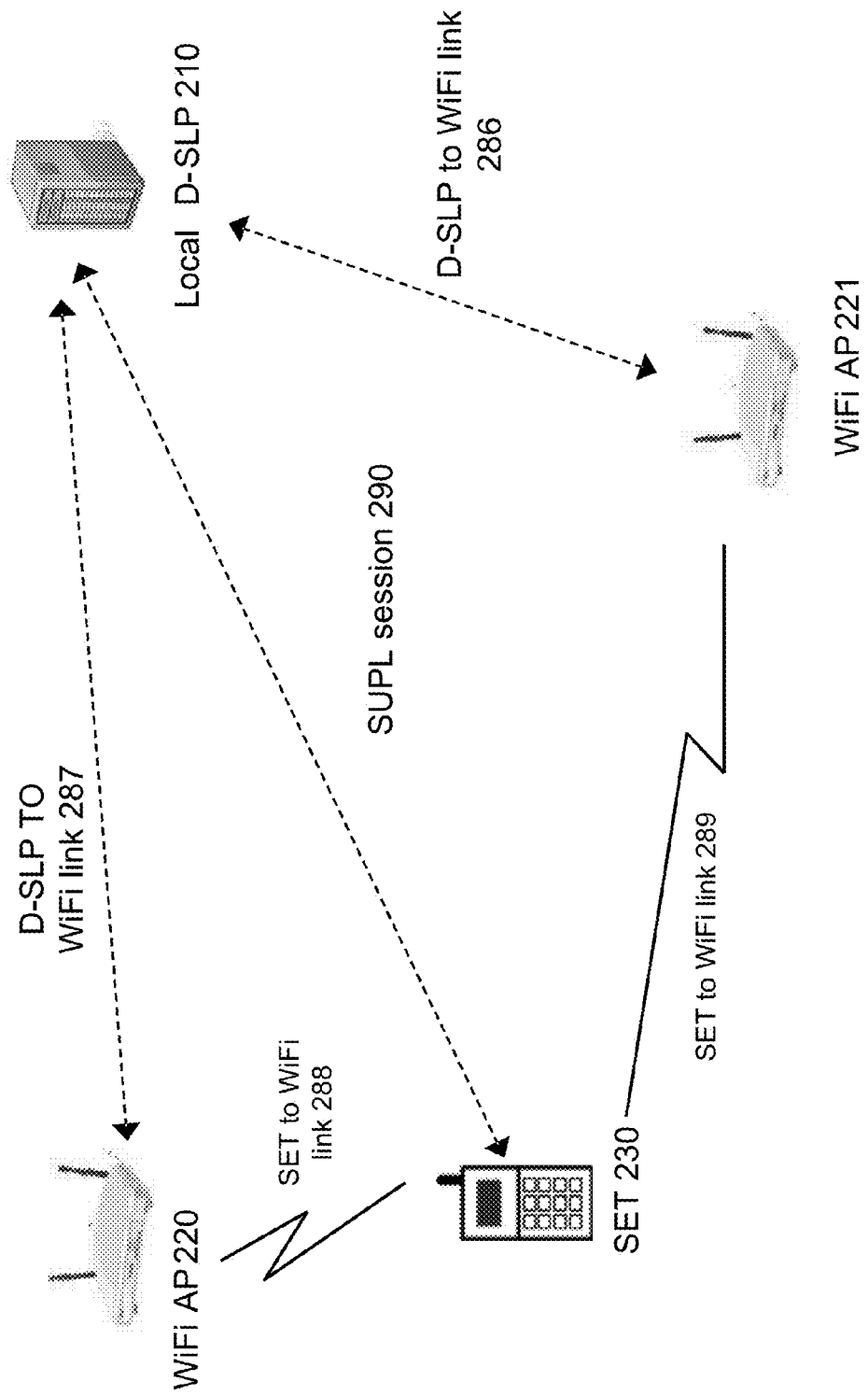
FIG. 2 is a system diagram illustrating a system for use with embodiments of the innovations presented herein.

FIG. 2 shows an additional system including multiple APs. FIG. 2 includes SET 230, D-SLP 210, WiFi AP 220, and WiFi AP 221. SET 230 may correspond to UE 130 in FIG. 1. D-SLP 210 may correspond to D-SLP 110 in FIG. 1. AP 220 or AP 221 may correspond to AP 120 in FIG. 1. As shown by FIG. 2, SET 230 may communicate with local D-SLP 210 in the form of a SUPL session 290 which may be instigated by either D-SLP 210 or SET 230 after SET 210 has discovered D-SLP 210 and been authorized to obtain location services from D-SLP 210 (e.g. by H-SLP 150 in FIG. 1). SUPL session 290 may employ LPP/LPPe as a positioning protocol or some other positioning protocol (e.g. RRLP, RRC or IS-801). SUPL session 290 may be used by D-SLP 210 to trigger IEEE 802.11v location tracking and/or timing measurement procedures for SET 230 by WiFi AP 220 and/or by WiFi AP 221 and/or possibly by other WiFi APs not shown in FIG. 2. This instigation may occur using the SUPL ULP protocol or using LPP/LPPe.

In one potential embodiment, D-SLP 210 may send an LPP/LPPe Request Location Information message to SET 230 (e.g. carried inside a SUPL POS message) to trigger network centric positioning support in SET 230. The LPP/LPPe message (and SUPL message) may be transferred to SET 230 via WiFi AP 221 or via AP 220 using WiFi communications link 286 or 287, respectively and thence via WiFi radio link 289 or 288, respectively. The LPP/LPPe message may provide SET 230 with any parameters (e.g. MAC address of WiFi AP 220 and/or AP 221) needed by SET 230 to support the invoked IEEE 802.11v network centric location procedure. SET 230 may then return to D-SLP 210 an LPP/LPPe Provide Location Information message (e.g. carried inside a SUPL POS message) to confirm or reject the request for network centric positioning of SET 230. In an alternate embodiment, new LPPe messages may be defined specific to network centric positioning which may be transferred between D-SLP 210 and SET 230 to invoke network centric positioning from D-SLP 210 and accept or reject the request from SET 230. In various different embodiments, LPPe capabilities may indicate the network centric location procedures that are supported by a target such as SET 230 and a server such as D-SLP 210, and this may be included as an extension to existing WiFi location support in LPPe rather than as a new position method in LPPe.

Figure 3:
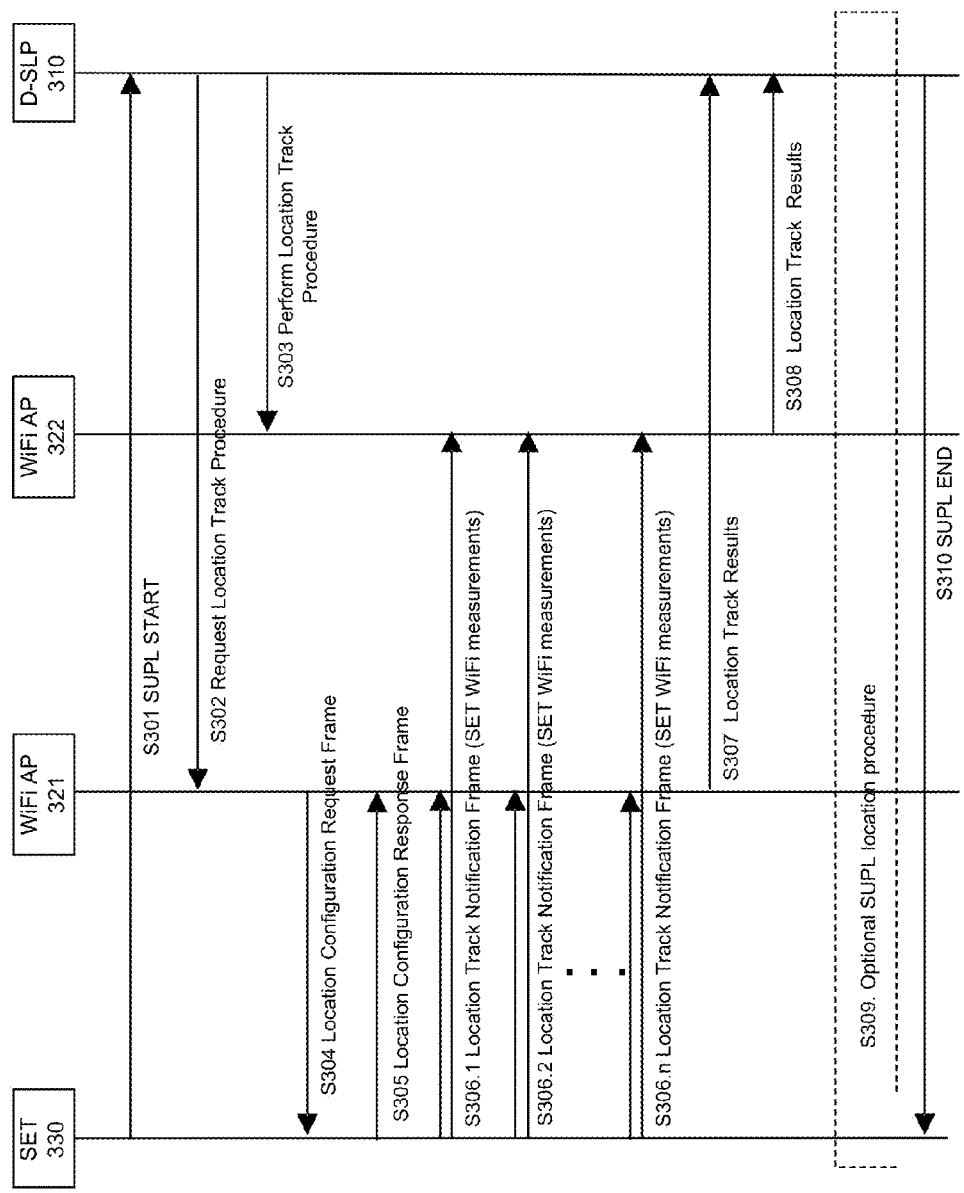
FIG. 3 is a flowchart illustrating a signal flow associated with a method according to one potential embodiment of the innovations presented herein.
Figure 4:
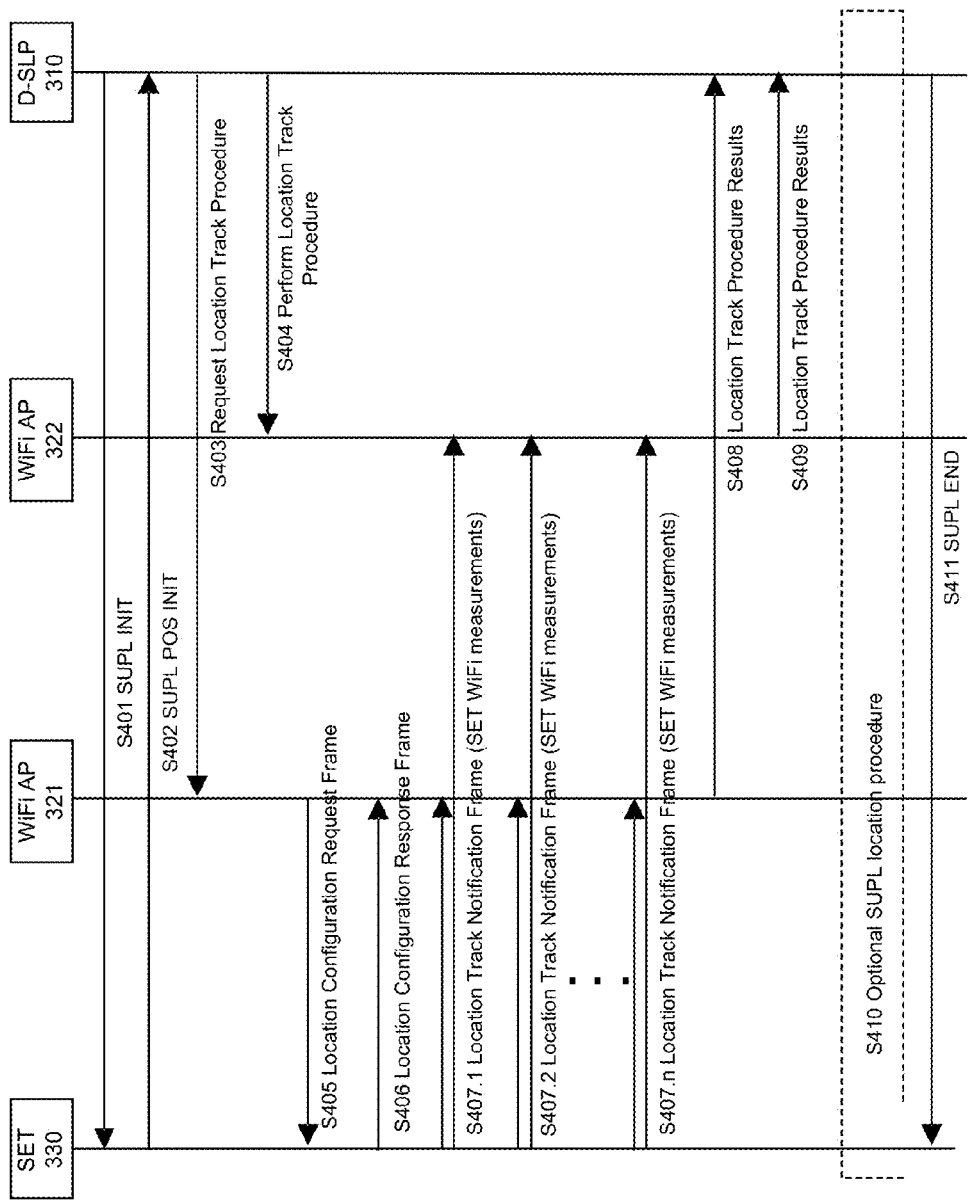
FIG. 4 is a flowchart illustrating a signal flow associated with a method according to one potential embodiment of the innovations presented herein.
Figure 5:
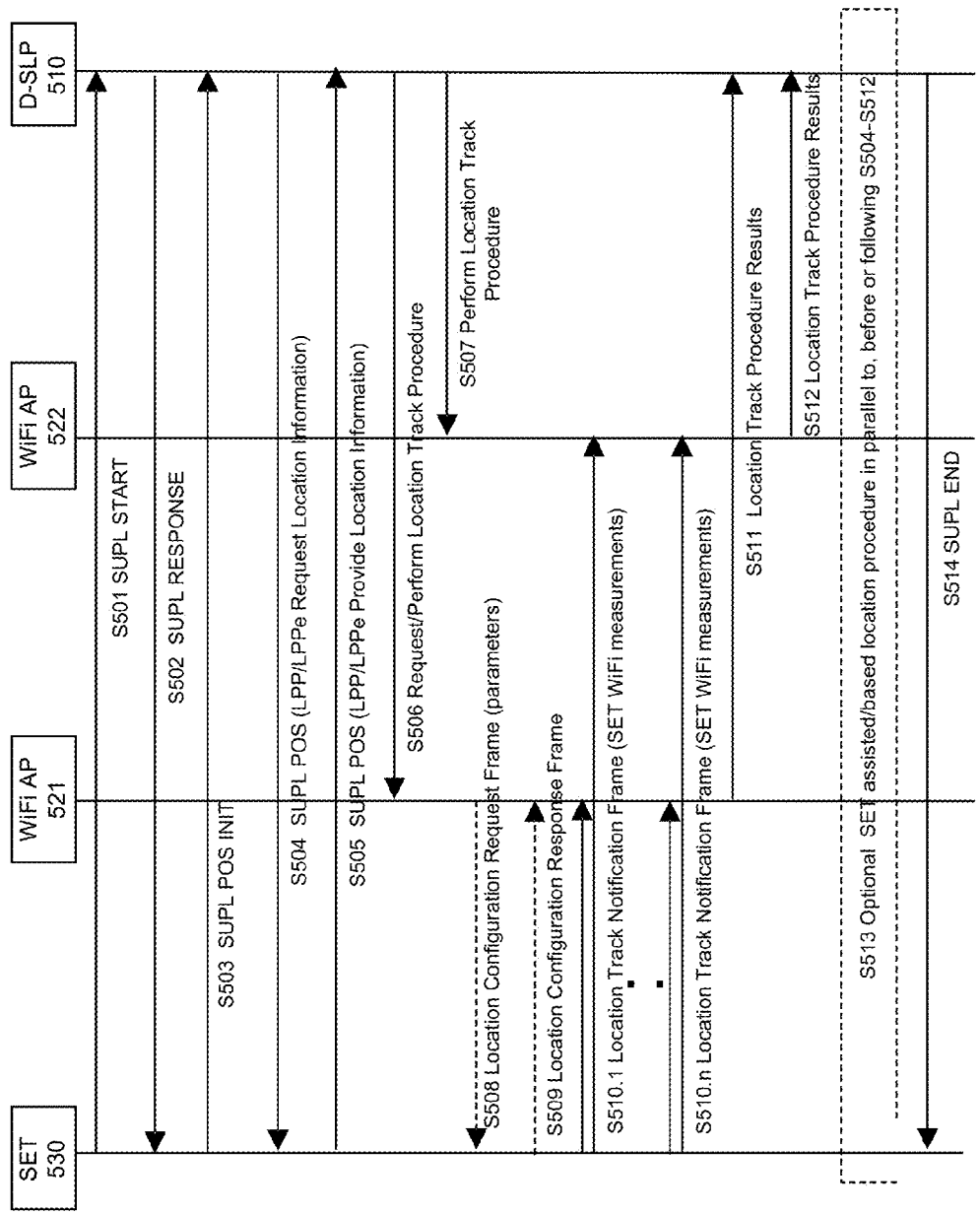
FIG. 5 is a flowchart illustrating a signal flow associated with a method according to one potential embodiment of the innovations presented herein.
Figure 6:
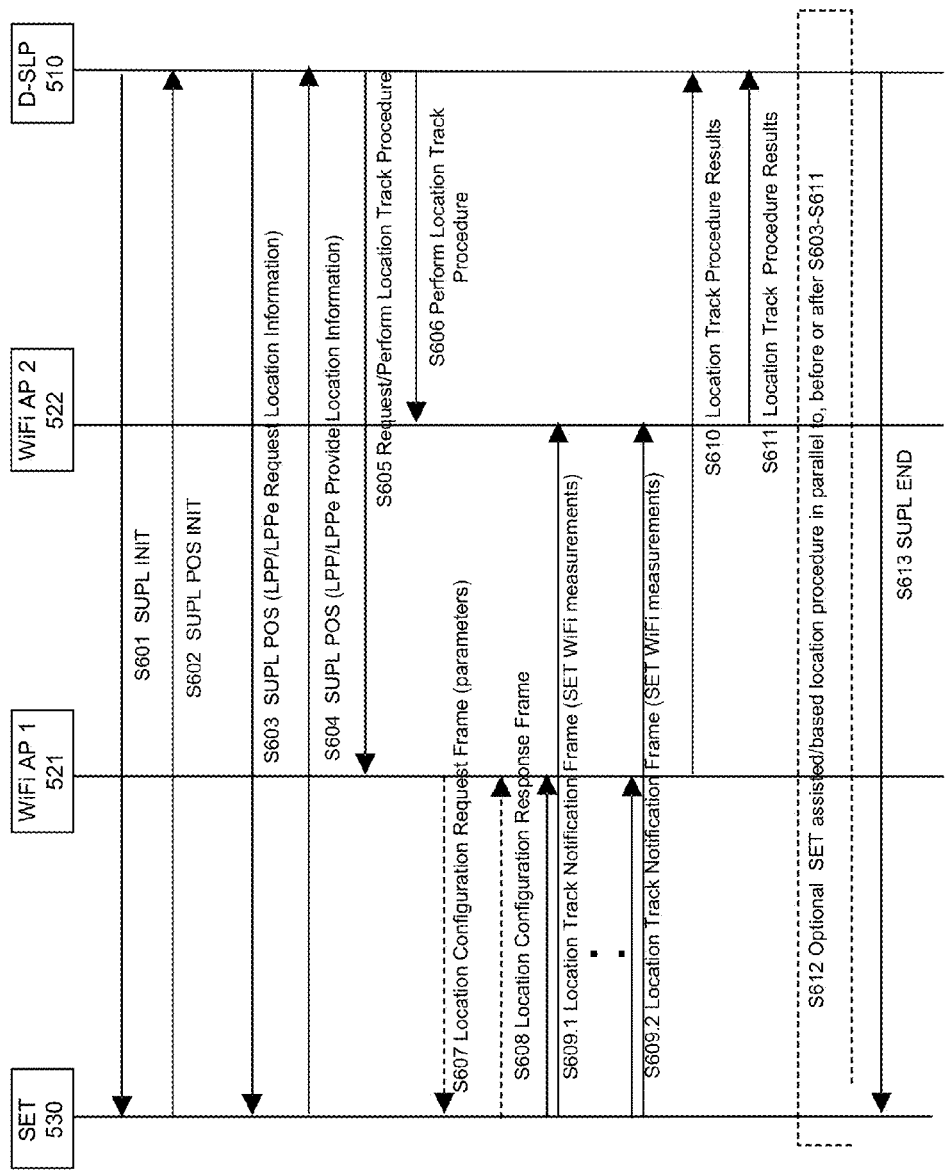
FIG. 6 is a flowchart illustrating a signal flow associated with a method according to one potential embodiment of the innovations presented herein.
Figure 7:
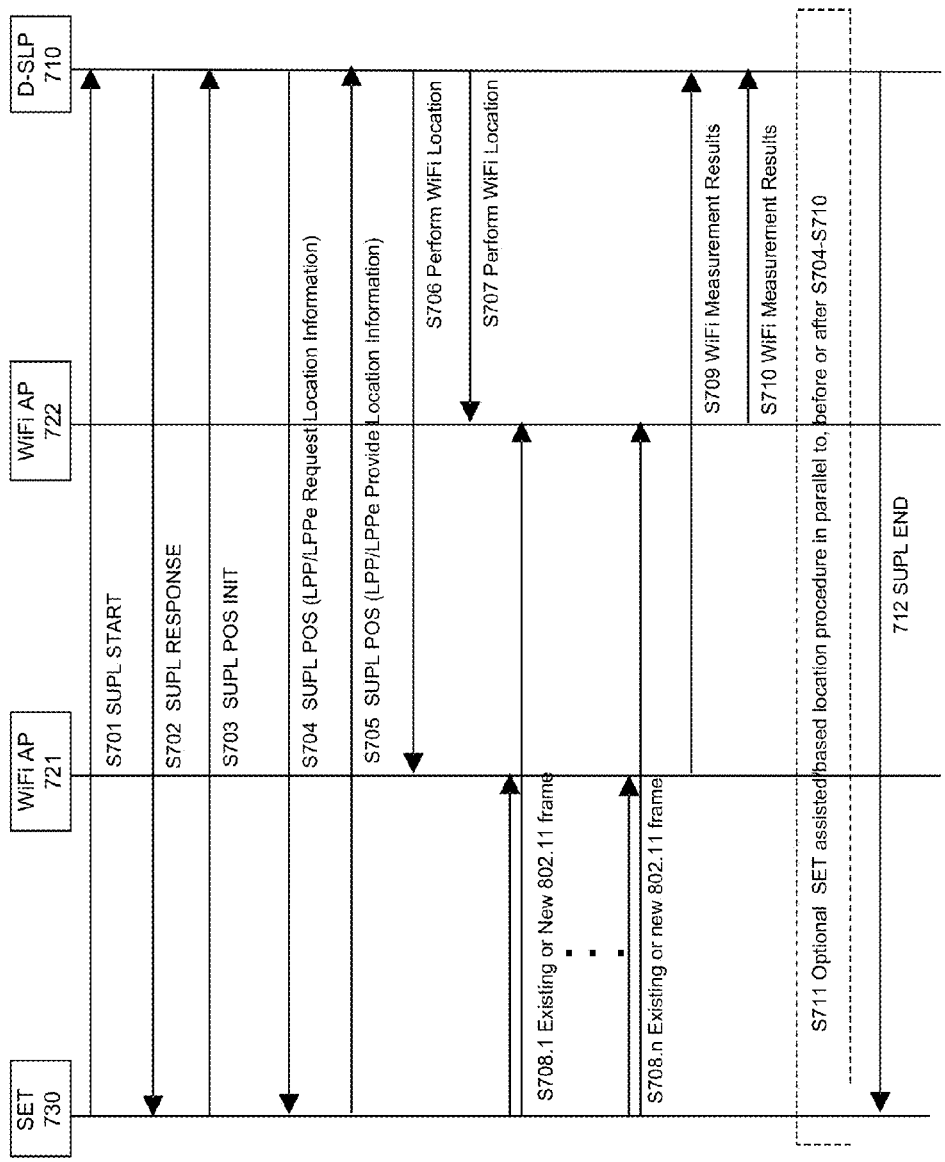
FIG. 7 is a flowchart illustrating a signal flow associated with a method according to one potential embodiment of the innovations presented herein.

FIGS. 3-7 describe various alternative embodiments, including aspects shown for hybrid positioning to describe systems and methods of network centric positioning. FIG. 3 illustrates an embodiment with SET initiated AP centric location using a location track procedure with SUPL. FIG. 4 illustrates an embodiment with SLP initiated AP centric location using a location track procedure with SUPL. FIG. 5 illustrates an embodiment with SET initiated AP centric location using a location track procedure with LPP/LPPe. FIG. 6 illustrates an embodiment with SLP initiated AP centric location using a location track procedure with LPP/LPPe. FIG. 7 illustrates a SET initiated AP centric location using a non-802.11v procedure (e.g. a procedure that may be proprietary or defined in some other non-802.11 standard). A precondition for each embodiment in FIGS. 3 to 7 is that the SET in each embodiment (e.g. SET 330 for FIG. 3) has discovered the address of, and been authorized to receive location services from and engage in location sessions with, the D-SLP in that embodiment (e.g. D-SLP 310 in FIG. 3). A further precondition is that any information needed by the SET (e.g. SET 330 in FIG. 3) to authenticate the D-SLP (e.g. D-SLP 310 in FIG. 3) has been provided to the SET and similarly any information needed by the D-SLP or by the SET to enable the D-SLP to authenticate the SET has been provided to the D-SLP or SET, respectively. The discovery, authorization and authentication information may be provided using other procedures and possibly relying on an H-SLP (not shown in the figures) which may occur before each procedure exemplified in FIGS. 3 to 7 starts to take place. It is assumed in each figure that the SET (e.g. SET 330 in FIG. 3) is able to receive signal transmission from both APs shown in each figure (e.g. APs 321 and 322 in FIG. 3). In each figure, the SET (e.g. SET 330 in FIG. 3) may correspond to SET 230 in FIG. 2 and/or to SET 130 in FIG. 1. The D-SLP in each figure (e.g. D-SLP 310 in FIG. 3) may correspond to D-SLP 210 in FIG. 2 and/or to D-SLP 110 in FIG. 1. One or both of the APs in each figure (e.g. AP 321 and AP 322 in FIG. 3) may correspond to AP 220 and/or AP 221 in FIG. 2 and/or to AP 120 in FIG. 1. While certain specific signal flows may be shown for the purpose of illustration, it will be understood that alternative embodiments and alternative signal flows to those shown in FIGS. 3-7 may be possible within the limits of the currently described innovations, and the innovations presented herein are not limited to the embodiments shown in FIGS. 3-7.

FIG. 3 shows one potential embodiment of location using a wireless access point in a network with a SUPL standardized system. FIG. 3 describes a system with computing device SET 330, access points AP 321 and AP 322, and location server D-SLP 310. In FIG. 3, SET 330 initiates a SUPL session with D-SLP 310 to enable SET 330 to obtain its own location. The procedure may start at step S301, where SET 330 establishes a secure IP connection to D-SLP 310 using the already known address of D-SLP 310. This may include SET 330 authentication of D-SLP 310 and/or D-SLP 310 authentication of SET 330 as part of step S301 or in a later step. SET 330 then sends a SUPL START message to D-SLP 310 to start a SUPL session. The SUPL START message includes the WiFi related capabilities of SET 310 and in this example indicates that SET 330 can support the IEEE 802.11v location track procedure. The SUPL START further includes the WiFi MAC address of SET 330 and the MAC addresses of those WiFi APs whose signaling can be, or has recently been, received by SET 330 (e.g. some or all APs with which SET 330 is in range). In this example, the WiFi MAC addresses include the addresses of AP 321 and AP 322. The SUPL START may also include WiFi measurements obtained by SET 330 (e.g. signal strength and/or RTT for AP 321 and/or AP 322). If SET 330 is currently receiving communications services from a WiFi AP (e.g. AP 321 or AP 322), the MAC address of this AP and any location measurements for the AP may be included in the SUPL Location ID parameter in the SUPL START message. Addresses and location measurements for APs from which the SET is not currently receiving communications services may be included in the Multiple Location IDs parameter in the SUPL START message.

Since the SUPL START message in step S301 indicates that SET 330 is capable of supporting the IEEE 802.11v location track procedure and provides the addresses of WiFi APs (such as APs 321 and 322) whose signals can be received by SET 330, D-SLP 310 decides to employ the IEEE 802.11v location track procedure to locate or help locate SET 330. D-SLP 310 next needs to decide which AP will be used to instigate the location track procedure. In this example AP 321 is chosen which may occur because SET 330 is currently using this AP to obtain communication services (e.g. as indicated by the inclusion of AP 321 MAC address in the SUPL Location ID parameter in the SUPL START) and/or because this AP produces the strongest signal at SET 330 and/or because this AP has the lowest RTT measurement (and is thus closest to SET 330) and/or for other reasons. At step S302, D-SLP 310 sends a message to AP 321 to request AP 321 to instigate an IEEE 802.11v location track procedure with SET 330. The message may include the MAC address of SET 330 and parameters pertinent to the location track procedure (e.g. the required or preferred SET reporting interval and duration). At step S303, D-SLP 310 sends a message to AP 322 to indicate that a location track procedure is being instigated by another AP (in this case AP 321) with SET 330 and that AP 322 needs to monitor for and measure SET response frames. The message in step S303 may include the MAC address of SET 330 and parameters pertinent to the location track procedure (e.g. the required or preferred SET reporting interval and duration) similar to step 302. D-SLP 310 may send the same or a similar message to that in step S303 to other APs not shown in FIG. 3. D-SLP 310 may determine the APs to perform measurements for the location track procedure using (i) APs indicated by SET 330 in step S301 as being APs with which SET 330 is in range, (ii) APs known by D-SLP 310 to be nearby to either any serving AP for SET 330 (such as AP 321) or any AP from which SET 330 can receive signals, (iii) APs nearby to an expected approximate location for SET 330 obtained from any location information (e.g. location measurements or an approximate location estimate) included by SET 330 in the SUPL START message in step S301, and/or (iv) APs lying in several or many different directions as seen from an approximate expected location for SET 330 in order to obtain location measurements with improved geometry. APs 321 and 322 may verify that the messages received in steps S302 and S303 were sent by D-SLP 310 and not by some other unauthorized entity—e.g. by verifying receipt of the messages over a secure transport connection from D-SLP 310.

AP 321 may instigate the location track procedure at step S304 by sending an IEEE 802.11v Location Configuration Request (LCR) frame to SET 330. The LCR frame may contain parameters pertinent to the location track procedure—e.g. the SET reporting interval and duration for steps S306.1 to S306.$n$, the frequency band and channel information for the SET reporting, a destination multicast address to be included in each report in steps 306.1 to 306.$n$, the transmit power to be used, etc. SET 330 may acknowledge the request in step S304 by returning an IEEE 802.11v Location Configuration Response frame at step S305 which may confirm that SET 330 will perform steps 306.1 to 306.$n$.

SET 330 may then transmit a sequence of n Location Track Notification (LTN) frames at steps 306.1, 306.2 up to 306.$n$ where the number of frames n may be greater than one and may have been specified by AP 321 in the LCR frame at step S304. Each LTN frame may include the transmission power and antenna gain used by SET 330 for the transmission, the received signal power and/or received signal to noise ratio measured by SET 330 for the received LCR frame at step S304, the time of transmission of the LTN and/or other information. The LTN frames may all be transmitted on the same radio channel or channels or some LTN frames may be transmitted on different radio channels to other LTN frames to facilitate reception and measurement by multiple APs (e.g. APs 321 and 322) which may each be receiving on different radio channels. APs (e.g. APs 321 and 322) may measure and record the arrival times of the received LTN frames for steps 306.1 to 306.$n$. After completion of steps 306.1 to 306.$n$ or at an earlier time (e.g. after just some of the n LTN frames have been received), AP 321 may send a message to D-SLP 310 at step S307 containing some or all of the information received in the LTN frames received in steps 306.1 to 306.$n$ (e.g. the times of transmission) and the measured arrival times. AP 322 may send a similar message to D-SLP 310 at step S308 and any other APs that were requested by D-SLP 310 to monitor and measure SET LTN frames may send similar messages to D-SLP 310 (not shown in FIG. 3). D-SLP 310 may use the measured arrival times of LTN frames at different APs to compute a time difference of arrival (TDOA) for transmission from SET 330 to any pair of APs. For example, if AP 321 reports to D-SLP 310 at step S307 that the LTN frame at step 306.1 was received by AP 321 at a time T1 and AP 322 reports to D-SLP 310 at step S308 that the LTN frame at step 306.1 was received by AP 322 at a time T2, then D-SLP 310 may determine the TDOA for transmission from SET 330 to APs 321 and 322 as T1-T2-T where T is the real time clock difference between APs 321 and 322 (i.e. the amount of time, positive or negative, by which the local clock at AP 321 is in advance of the local clock at AP 322). The real time clock difference T between a pair of APs such as APs 321 and 322 may be obtained by these APs using the IEEE 802.11v Timing Measurement procedure (not shown in FIG. 3) and transferred to D-SLP 310 at step S307 and/or step S308 or in separate steps not shown in FIG. 3. D-SLP 310 may combine TDOA results for a particular pair of APs (e.g. APs 321 and 322) from separate TDOA results for each of the LTN frames measured and reported at steps S307 and S308—e.g. TDOA results may be averaged. D-SLP 330 may further obtain combined (e.g. averaged) TDOA results for other pairs of APs not shown in FIG. 3. Assuming D-SLP 310 has been configured with the locations of the APs (e.g. APs 321 and 322) or receives the locations from the APs as part of steps S307 and S308, D-SLP 310 may compute a location for SET 330 based on the TDOA results and the known locations of the APs (e.g. APs 321 and 322) using known location methods such as trilateration.

In some other embodiments, D-SLP 310 may use the measurements received from APs 321 and 322 in steps S307 and S308 (and possibly received from other APs not shown in FIG. 3) to compute a location for SET 330 in some other way different to that described above. For example, APs 321 and 322 may be synchronized to one another and/or to a common time such as Global Positioning System (GPS) time in which case, the real time clock difference T between APs 321 and 322 may be known (e.g. may be zero) and thus may not need to be measured.

In some embodiments at step S309, D-SLP 310 may continue the SUPL location session started by SET 330 at step S301 by returning a SUPL response message to SET 330—e.g. a SUPL RESPONSE message—in order to instigate mobile centric positioning whereby SET 330 may measure signals received from WiFi APs such as APs 321 and 322 and/or radio signals received from other sources such as navigation satellites and/or cellular base stations and may then either return the signal measurements to D-SLP 310 or compute a location using the signal measurements and return the location estimate to D-SLP 310. In the case of measurements for WLAN APs, SET 330 may measure the TDOA between any pair of APs, the RTT to any AP, the signal strength received from any AP and/or the signal to noise ratio received from any AP. Such mobile centric positioning in step S309 may occur in parallel to, following or after the network centric positioning in steps S302 to S308 and may make use of positioning protocol messages carried within SUPL messages in step S309 such as messages for RRLP, RRC, LPP, LPP/LPPe or IS-801. The mobile centric positioning in step S309 may be invoked by D-SLP 310 (e.g. by D-SLP 310 sending an LPP/LPPe Request Location Information message to SET 330 contained in a SUPL POS message) or may be initiated by SET 330 (e.g. based on LPP/LPPe capabilities for D-SLP 330 transferred to SET 330 from D-SLP 310 as part of step S309). Any mobile centric location measurements or location estimate may be provided to D-SLP 310 by SET 330 in an LPP/LPPe Provide Location Information message contained in a SUPL POS message. D-SLP 310 may then combine the mobile centric location measurements or location estimate received from SET 330 with the TDOA measurements obtained from steps S307 and S308 or the location obtained from these TDOA measurements to obtain a more reliable and accurate location for SET 330. The SUPL response message sent by D-SLP 310 at step S309 may also inform SET 330 that a location track procedure will be invoked at step S304 and may identify the AP (AP 321) that will invoke this procedure. In this case, the SUPL response message in step S309 may be sent before steps S302 and S303 have occurred. In other embodiments, a SUPL response message at step S309 may be sent by D-SLP 310 to SET 330 to inform SET 330 about the location track procedure but mobile centric positioning may not be invoked by D-SLP 310 in step S309. In this case, D-SLP 310 may obtain the location of SET 330 only using network centric positioning based on the TDOA results obtained following steps S307 and S308.

The SUPL procedure may terminate at step S310 with D-SLP 310 sending a SUPL END message to SET 330 containing any location estimate obtained by D-SLP 310 for SET 330. SET 330 may in some embodiments, send a further request to D-SLP 330 for further location support (e.g. if the location estimate received in step S310 is not accurate enough). The WiFi network centric positioning related information may be carried within SUPL messages (e.g. the SUPL START in step S301 and any SUPL response message in step S309) using SUPL ULP parameters as indicated above—e.g. using the Location ID and Multiple Location IDs SUPL parameters. In some embodiments, some or all of the SUPL messages exchanged between D-SLP 310 and SET 330 as part of steps S301, S309 and S310 may be communicated via AP 321 and/or via AP 322—e.g. if AP 321 and/or AP 322 provide communication service to SET 330 and have direct or indirect communication links to D-SLP 310.

Although FIG. 3 exemplifies use of WiFi network centric positioning using the IEEE 802.11v location track procedure, other IEEE 802.11v location procedures or other non-IEEE 802.11 location procedures may be invoked by D-SLP 310 at steps S302 and S303 in APs 321 and 322 (and in other APs not shown in FIG. 3) in addition to or instead of the location track procedure. One example of another IEEE 802.11v procedure is the Timing Measurement procedure in which an AP and a SET measure a clock offset between each other and an RTT. In this case, APs 321 and/or 322 may exchange other frames with SET 330 in steps different to steps S304 to S306 and may report the different measurement results to D-SLP 330 in steps S308 and S309 instead of or in addition to the location track measurement results discussed earlier. The different measurement results may include TDOAs, RTTs, signal strengths and/or signal to noise ratios. The different measurement results may be obtained by APs 321 and/or 322 (and/or possibly by other APs) within a limited time duration or time window—e.g. as indicated by D-SLP 310 in steps S302 and S303. When such alternative IEEE 802.11v or non-IEEE 802.11 location procedures are invoked by D-SLP 310 in AP 321 and/or AP 322, D-SLP 310 may inform SET 330 that the procedures will be invoked as part of step S309 in order to prepare SET 330 for the instigation of these procedures by AP 321 and/or AP 322—e.g. to enable SET 330 to know that the procedures were authorized by D-SLP 310 which may be trusted by SET 330.

The communication to APs 321 and 322 in steps S302 and S303 in FIG. 3 may be coordinated by D-SLP 310 to control timing and integrating of any measurement made by APs 321 and 322. This may reduce the amount of signaling that needs to be supported by a UE and WiFi AP under the 802.11v standard systems as part of the steps shown—e.g. may reduce the number of LTN frames n that need to be transmitted by SET 330 in steps S306.1 to S306.n. Security may be improved because the SET 330 can be informed by D-SLP 310 at step S309 that instigation of a location track procedure has been authorized from AP 321 by D-SLP 310 which may be a server trusted by SET 330. Reliability may be improved because the trusted D-SLP 310 can be provided with both a SET 330 global identity (e.g. IMSI) and the SET 330 MAC address at step S301 allowing D-SLP 310 to use the MAC address for WiFi network centric location at steps S302 to S308 and to associate the ensuing location with the SET 330 global identity which may enable transfer of the SET 330 location (subject to any privacy restrictions) to some external client that references SET 330 using the global identity.

FIG. 4 describes a similar method of an alternative embodiment, which may be performed using the same computing elements SET 330, D-SLP 310, and APs 321 and 322 as in FIG. 3. Instead of showing a request for location services from SET 330, however, FIG. 4 describes a network initiated request for the location of SET 330 which may be instigated by some external client sending a location request (not shown in FIG. 4) for SET 330 to D-SLP 310. Following such a possible request for the location of SET 330 sent to D-SLP 310 by an external client or possibly by another SET (not shown in FIG. 4), D-SLP 310 may initiate a SUPL session with SET 330 by transferring a SUPL INIT message to SET 330 at step S401. The SUPL INIT message may be transferred via Short Message Service (SMS) making use of a known global identity for SET 330 (e.g. an international telephone number for SET 330) which may have been provided to D-SLP 310 by a requesting external client. Alternatively, the SUPL INIT may be transferred using the IETF User Datagram Protocol (UDP) over Internet Protocol (IP) if D-SLP 310 has the current IP address of SET 330 (e.g. as obtained from a previous SUPL session with SET 330 such as that exemplified in FIG. 3). Other means of SUPL INIT transfer may also be possible such as using the Session Initiation Protocol (SIP). The SUPL INIT message may include the address of D-SLP 310 (e.g. a Fully Qualified Domain Name (FQDN) or an IP address) and the identity of any external client that has requested the location of SET 330. When SET 330 receives the SUPL INIT message, it can know that its location is requested by D-SLP 310 (e.g. on behalf of an external client that may also be identified in the SUPL INIT). SUPL notification and privacy procedures may then be used whereby SET 330 determines if D-SLP 310 is a trusted SLP and whether any identified external client is authorized to receive the location of SET 330. The notification and privacy procedures may include notifying the user of SET 330 that SET 330 location is being requested and providing the user of SET 330 with an identification of any requesting external client thereby allowing the user to accept or reject the location request. Since D-SLP 310 is assumed in this example to have been authorized to SET 330 (e.g. by an H-SLP for SET 330) and assuming any requesting external client is also authorized to receive the location of SET 330 (e.g. due to the user of SET 330 accepting the location request), SET 330 can respond positively to D-SLP 310 at step S402. It should be noted that while such support of privacy and security is present in the example method of FIG. 4, this may not be present in the case that network centric location only was used to locate SET 330 (e.g. employing IEEE 802.11v location procedures) since none of the information communicated to SET 330 by D-SLP 310 in the SUPL INIT of step S401 may be provided. Therefore, the method of FIG. 4 may be more secure.

As part of the response in step S402, SET 330 initiates a secure IP connection to D-SLP 310 using the address of D-SLP 310 received in step S401. Establishing the secure IP connection may include SET 330 authentication of D-SLP 310 and/or D-SLP 310 authentication of SET 330 as part of step S401 or in a later step. SET 330 may then send a SUPL POS INIT message to D-SLP 310 over the secure IP connection. The SUPL POS INIT message may include the WiFi related capabilities of SET 330 and in this example indicates that SET 330 can support the IEEE 802.11v location track procedure. The SUPL POS INIT message further includes the WiFi MAC address of SET 330 and the MAC addresses of those WiFi APs whose signaling can be or has recently been received by SET 330. In this example, the WiFi MAC addresses include the addresses of AP 321 and AP 322. The SUPL POS INIT may also include WiFi measurements obtained by SET 330 (e.g. signal strength and/or RTT for AP 321 and/or AP 322). If SET 330 is currently receiving communications services from a WiFi AP (e.g. AP 321 or AP 322), the MAC address of this AP and any location measurements for the AP may be included in the SUPL Location ID parameter in the SUPL POS INIT message. Addresses and location measurements for APs from which the SET is not currently receiving communications services may be included in the Multiple Location IDs parameter in the SUPL POS INIT message.

Since the SUPL POS INIT message in step S402 indicates that SET 330 is capable of supporting the IEEE 802.11v location track procedure and provides the addresses of WiFi APs (such as APs 321 and 322) whose signals can be received by SET 330, D-SLP 310 decides to employ the IEEE 802.11v location track procedure to locate or help locate SET 330. The invocation of the location track procedure and the possible use of mobile centric positioning in addition then occur in steps S403 through S410 just as described previously in FIG. 3 for steps S302 through S309. Further, the use of other IEEE 802.11v or other non-IEEE 802.11 location procedures may also occur instead of or in addition to the location track procedure as described for FIG. 3. Following step S409 or step S410 if used, D-SLP 310 may have determined the location of SET 330 (e.g. from measurements for the location track procedure) and may provide the location to any external client that originally requested the location (not shown in FIG. 4). D-SLP 310 may then terminate the SUPL session at step S411 by sending a SUPL END message to SET 330 which may in some embodiments include the determined location of SET 330. In some implementations, the SUPL END at step S411 may be sent before the network centric positioning in steps S403 to S409 has terminated—e.g. when no mobile centric positioning from SET 330 is needed.

FIG. 5 describes an alternative embodiment similar to the embodiment in FIG. 3 but using the LPP/LPPe positioning protocol rather than SUPL ULP protocol to convey information between a SET and SLP related to WiFi network centric positioning. FIG. 5 includes SET 530, APs 521 and 522, and location server SLP 510. FIG. 5 shows a location request initiated by SET 530—e.g. in response to a location request from some application on SET 530 or the user of SET 530. The procedure may start at step S501, where SET 530 establishes a secure IP connection to D-SLP 510 using an already known address of D-SLP 510. This may include SET 530 authentication of D-SLP 510 and/or D-SLP 510 authentication of SET 530 as part of step S501 or in a later step. SET 530 then sends a SUPL START message to D-SLP 510 to start a SUPL session. The SUPL START message may include the SUPL capabilities of SET 530 but may not include any WiFi related capabilities of SET 510. On receipt of the SUPL START message in step S501, D-SLP 510 may become aware of the location request from SET 530 and returns a SUPL RESPONSE message to SET 530 that may include the SUPL capabilities of D-SLP 510. However, the SUPL RESPONSE may not contain any information related to WiFi network centric positioning. SET 530 may respond to the SUPL RESPONSE by returning a SUPL POS INIT message to D-SLP 510 which may contain information about any serving WiFi AP for SET 530 (e.g. AP 521 or AP 522) and may include measurements for any serving WiFi AP and/or for other non-serving WiFi APs. Steps S501, S502 and S503 may following normal SUPL session procedures and may not transfer information related to network centric WiFi positioning directly in SUPL ULP parameters. At step S504, D-SLP 510 may send a SUPL POS message to SET 530 to start a positioning session and may include in the SUPL POS message an LPP/LPPe Request Location Information message that may include a request to perform an IEEE 802.11v location track procedure and further identify the WiFi AP 521 that will initiate this procedure. D-SLP 510 may determine that AP 521 should initiate the location track procedure from information provided in the SUPL POS INIT message in step S503 which may indicate that AP 521 is a serving AP for SET 530 or is an AP from which SET 530 can receive signals. The LPP/LPPe Request Location Information message may also include a request for mobile centric location information (e.g. measurements of navigation satellites, cellular base stations and/or WiFi APs) by SET 530 in which case mobile centric positioning described later for step S513 may also occur. The network centric WiFi information included in the LPP/LPPe Request Location Information message in step S504 (e.g. the identification of the location track procedure and AP 521) may be contained in LPPe parameters for the LPPe protocol rather than in LPP parameters for the LPP protocol and thus may be confined to an LPPe message embedded in an LPP message.

In response to the LPP/LPPe Request Location Information message received in step S504, SET 530 may return a SUPL POS message to D-SLP 510 at step S505 carrying an LPP/LPPe Provide Location Information message. The LPP/LPPe Provide Location Information message may include a confirmation from SET 530 that the location track procedure requested by D-SLP 510 at step S504 can be supported by SET 530 and will be supported as part of the current SUPL session. Based on the confirmation in step S505, D-SLP 510 decides to employ the IEEE 802.11v location track procedure to locate or help locate SET 530. The invocation of the location track procedure then occurs in steps S506 through S512 just as described previously in FIG. 3 for steps S302 through S308. One possible difference to FIG. 3 is that the location configuration request and response frames of steps S508 and S509 may be omitted if D-SLP 510 provides information to SET 530 on the required location track notification frames for steps S510.1 through S510.*n* in the LPP/LPPe Request Location Information message at step S504. In this alternative embodiment, D-SLP 510 rather than AP 521 would configure the location track procedure and would also notify APs 521 and 522 at steps S506 and S507 (and any other APs involved in the procedure) regarding the location track notification frames to be transmitted by SET 530 at steps S510.1 through S510.*n* that need to be measured. This alternative embodiment may reduce the amount of 802.11 signaling that needs to be supported by SET 530 and may avoid the need for any AP to support initiation of the location track procedure at step S508. Instead, all APs (e.g. APs 521, 522) may just monitor and measure LTN frames from SET 530 at steps S510.1 to S510.*n*. This alternative embodiment may still be compliant with the IEEE 802.11v procedure from an AP perspective (thus may not need proprietary changes to APs) and may reduce implementation in SET 530 as well as reducing signaling and delay.

Further, the use of other IEEE 802.11v or other non-IEEE 802.11v location procedures may also occur instead of or in addition to the location track procedure in steps S506 to S512 (or steps S506 to S512 without steps S508 and S509 if these are omitted) as described for FIG. 3. Similar to step S309 in FIG. 3, D-SLP 510 may also instigate mobile centric positioning of SET 530 at step S513 which may occur before, after or in parallel to steps S504 to S512. In step S513, D-SLP 510 and SET 530 may exchange SUPL POS messages carrying embedded LPP/LPPe positioning protocol messages which may convey assistance data and/or mobile centric location request information to SET 530 from D-SLP 510 and may convey a request for assistance data and/or mobile centric location measurements (e.g. which may occur for a SET assisted location procedure) or a location estimate (e.g. which may occur for a SET based location procedure) to D-SLP 510 from SET 530. The first LPP/LPPe positioning protocol message transferred for this mobile centric positioning session may be the LPP/LPPe Request Location Information message transferred at step S504 as indicated earlier.

Following step S512 or possibly following step S513 if step S513 occurs, D-SLP 510 may determine a location for SET 530 using the network centric location results received in steps S511 and S512 and any mobile centric location results received as part of step S513. The SUPL procedure may then terminate at step S514 with D-SLP 510 sending a SUPL END message to SET 530 containing any location estimate obtained by D-SLP 510 for SET 530. SET 530 may in some embodiments, send a further request to D-SLP 530 for further location support (e.g. if the location estimate received in step S514 is not accurate enough). The WiFi network centric positioning related information in FIG. 5 may be carried within LPP/LPPe messages (e.g. the LPP/LPPe Request Location Information message in step S504 and/or the LPP/LPPe Provide Location Information message in step S505) and may be confined just to LPPe rather than LPP messages. Some WiFi network centric positioning related information (e.g. an identification of a serving WiFi AP or WiFi AP measurements) may also be conveyed in SUPL messages (e.g. in the SUPL START, SUPL RESPONSE and/or SUPL POS NIT of steps S501, S502 and S503) in the case that this information is already present in SUPL for mobile centric positioning.

Alternative embodiments to FIG. 5 are also possible in which LPP/LPPe positioning protocol messages are still used to transfer network centric WiFi positioning information but are conveyed differently to the example in FIG. 5. For example, SET 530 may include an LPP/LPPe Provide Capabilities message in the SUPL POS NIT message sent at step S503 that may indicate to D-SLP 510 the WiFi network centric positioning capabilities of SET 530 including the ability of SET 530 to support the IEEE 802.11v location track procedure. In this case, steps S504 and S505 may not be needed and D-SLP 510 may instigate the location track procedure in steps S506 through S512 immediately after receiving the SUPL POS NIT message at step S503 thereby reducing signaling and delay.

Similar to the relationship between the embodiments of FIGS. 3 and 4, FIG. 6 shows an embodiment where LPP/LPPe functionality as described in FIG. 5 is used to support WiFi network centric positioning for a location request originating from the network side (e.g. due to a location request for SET 530 from some external client not shown in FIG. 6). Following a possible request for the location of SET 530 sent to D-SLP 510 by an external client or possibly by another SET (not shown in FIG. 6), D-SLP 510 may initiate a SUPL session with SET 530 by transferring a SUPL INIT message to SET 530 at step S601. Steps S601 and S602 may then proceed as described earlier herein for steps S401 and S402 in FIG. 4 except that the SUPL INIT in step S601 and the SUPL POS NIT in step S602 may not contain WiFi network centric positioning related information.

At step S603, D-SLP 510 may send a SUPL POS message to SET 530 to start a positioning session and may include in the SUPL POS message an LPP/LPPe Request Location Information message that may include a request to perform an IEEE 802.11v location track procedure and further identify the WiFi AP 521 that will initiate this procedure. Step S603 and succeeding steps S604 to S612 may then proceed as described for steps S504 to S513 in FIG. 5. This may include use of the alternative embodiments described for FIG. 5 in which (i) mobile centric positioning may be performed in step S612, (ii) other IEEE 802.11v and non-IEEE 802.11v location procedures may be used instead of or in addition to the location track procedure of steps S605 to S611 and/or (iii) steps S607 and S608 may be omitted (by conveying information regarding the LTN frames in steps S609.1 to S609.*n* to SET 530 in the LPP/LPPe Request Location Information message at step S603 and to APs 521 and 522 at steps S605 and S606).

Following step S611 or step S612 if used, D-SLP 510 may have determined the location of SET 530 (e.g. from measurements for the location track procedure) and may provide the location to any external client that originally requested the location (not shown in FIG. 6). D-SLP 510 may then terminate the SUPL session at step S613 by sending a SUPL END message to SET 530 which may in some embodiments include the determined location of SET 530. In some implementations, the SUPL END at step S613 may be sent before the network centric positioning in steps S605 to S611 has terminated—e.g. when no mobile centric positioning from SET 530 is needed.

FIG. 7 shows one potential embodiment of location using a wireless access point in a network with a non-IEEE 802.11v location procedure. The procedure in FIG. 7 may be similar or identical to that described for FIG. 5 when a non-IEEE 802.11v location procedure is used in FIG. 5 instead of the location configuration procedure and when steps S508 and S509 in FIG. 5 are omitted. FIG. 7 shows a location request initiated by SET 730—e.g. in response to a location request from some application on SET 730 or the user of SET 730. The procedure may start at step S701, where SET 730 establishes a secure IP connection to D-SLP 710 using an already known address of D-SLP 710. This may include SET 730 authentication of D-SLP 710 and/or D-SLP 710 authentication of SET 730 as part of step S701 or in a later step. SET 730 then sends a SUPL START message to D-SLP 710 to start a SUPL session. The SUPL START message may include the SUPL capabilities of SET 730 but may not include any WiFi related capabilities of SET 710. On receipt of the SUPL START message in step S701, D-SLP 710 may become aware of the location request from SET 730 and returns a SUPL RESPONSE message to SET 730 at step S702 that may include the SUPL capabilities of D-SLP 710. However, the SUPL RESPONSE may not contain any information related to WiFi network centric positioning. SET 730 may respond to the SUPL RESPONSE by returning a SUPL POS INIT message to D-SLP 710 which may contain information about any serving WiFi AP for SET 730 (e.g. AP 721 or AP 722) and may include measurements for any serving WiFi AP and/or for other non-serving WiFi APs. Steps S701, S702 and S703 may following normal SUPL session procedures and may not transfer information related to network centric WiFi positioning directly in SUPL ULP parameters. At step S704, D-SLP 710 may send a SUPL POS message to SET 730 to start a positioning session and may include in the SUPL POS message an LPP/LPPe Request Location Information message that may include a request to perform some network centric location procedure that may not be part of the IEEE 802.11 standards. The LPP/LPPe Request Location Information message may also include a request for mobile centric location information (e.g. measurements of navigation satellites, cellular base stations and/or WiFi APs) by SET 730 in which case mobile centric positioning described later for step S711 may also occur.

In response to the LPP/LPPe Request Location Information message received in step S704, SET 730 may return a SUPL POS message to D-SLP 710 at step S705 carrying an LPP/LPPe Provide Location Information message. The LPP/LPPe Provide Location Information message may include a confirmation from SET 730 that the network centric location procedure requested by D-SLP 710 at step S704 can be supported by SET 730 and will be supported as part of the current SUPL session. Based on the confirmation in step S705, D-SLP 710 invokes the WiFi network centric location procedure notified to SET 730 at step S704 by sending a request to perform this procedure to AP 721 at step S706 and to AP 722 at step S707 and possibly to other APs not shown in FIG. 7. The request sent in steps S706 and S707 identifies the location procedure and provides any needed parameters (e.g. duration of the procedure, types of measurements needed). Based on the WiFi network centric location procedure request sent to SET 730 at step S704, SET 730 may transmit one or more existing IEEE 802.11 frames (e.g. LTN frames) and/or one or more new frames that may not be defined by IEEE at steps S708.1 through S708.n. WiFi APs 721 and 722 (and possibly other APs) may then receive these frames and perform location related measurements—e.g. may measure the times of arrival, received signal strength and/or received signal to noise ratio for the received frames. Further, one or more of WiFi APs 721 and 722 (and/or other APs) may transmit one or more existing IEEE 802.11 frames or new frames to SET 730 and/or to other APs which may instigate a response from SET 730 and/or a response from other APs and/or may trigger location measurements by SET 730 and/or location measurements by other APs (e.g. of time of arrival or signal strength). The location procedure performed by SET 730 and WiFi APs 721, 722 and possibly other APs may enable measurements of TDOA (e.g. TDOA of received SET 730 signals by a pair of APs), RTT (e.g. between SET and some AP), signal strength and/or signal to noise ratio by SET 730 and/or by APs 721 and 722 and possibly other APs. APs 721 and 722 may return any measurement results to D-SLP 710 at steps S709 and S710, respectively. Other APs may also return measurement results to D-SLP 710 (not shown in FIG. 7).

D-SLP 710 may also instigate mobile centric positioning of SET 730 at step S711 which may occur before, after or in parallel to steps S704 to S710. In step S711, D-SLP 710 and SET 730 may exchange SUPL POS messages carrying embedded LPP/LPPe positioning protocol messages which may convey assistance data and/or mobile centric location request information to SET 730 from D-SLP 710 and/or may convey a request for assistance data and/or mobile centric location measurements or a location estimate to D-SLP 710 from SET 730. The first LPP/LPPe positioning protocol message transferred for this mobile centric positioning session may be the LPP/LPPe Request Location Information message transferred at step S704 as indicated earlier. Any location measurements obtained by SET 730 as part of WiFi network centric positioning described earlier for steps S706 to S710 may be provided to D-SLP 730 using LPP/LPPe positioning protocol messages as part of step S711.

Following step S710 or possibly following step S711 if step S711 occurs, D-SLP 710 may determine a location for SET 730 using the network centric location results received in steps S709 and S710 and any mobile centric location results received as part of step S711. The SUPL procedure may then terminate at step S712 with D-SLP 710 sending a SUPL END message to SET 730 containing any location estimate obtained by D-SLP 710 for SET 730. SET 730 may in some embodiments, send a further request to D-SLP 730 for further location support (e.g. if the location estimate received in step S712 is not accurate enough). The WiFi network centric positioning related information in FIG. 7 may be carried within LPP/LPPe messages (e.g. the LPP/LPPe Request Location Information message in step S704 and/or the LPP/LPPe Provide Location Information message in step S705). However, unlike in FIG. 5, WiFi network centric positioning related information may relate to location procedures not defined by IEEE. Some WiFi network centric positioning related information (e.g. an identification of a serving WiFi AP or WiFi AP measurements) may also be conveyed in SUPL messages (e.g. in the SUPL START, SUPL RESPONSE and/or SUPL POS INIT of steps S701, S702 and S703) in the case that this information is already used in SUPL for mobile centric positioning.

As described earlier for FIG. 5, alternative embodiments to FIG. 7 are also possible in which LPP/LPPe positioning protocol messages are used to transfer network centric WiFi positioning information but are conveyed differently to the example in FIG. 7. For example, SET 730 may include an LPP/LPPe Provide Capabilities message in the SUPL POS INIT sent at step S703 that may indicate to D-SLP 710 the WiFi network centric positioning capabilities of SET 730 including the ability of SET 730 to support location procedures not defined by IEEE. In this case, steps S704 and S705 may not be needed and D-SLP 710 may instigate a network centric location procedure in steps S706 through S710 immediately after receiving the SUPL POS INIT message at step S703 thereby reducing signaling and delay.

While the embodiments of FIGS. 3-7 are shown with two access points, in various embodiments, location measurements may be taken in a wireless network using only a single access point. In other embodiments, larger numbers of access points may be used. In still further embodiments, access point measurements may occur continuously, with a hand off of measurements between access points (e.g. which may be coordinated by the access points or by a location server such as a D-SLP or H-SLP) as a user and the user's SET, UE, or other computing device moves in and out of range of various access points.

Additionally, various alternative embodiments may support download of assistance data from an SLP to a SET using, for example, LPP/LPPe to support mobile centric positioning, as occurring for example in steps S309, S410, S513, S612 and S711 of FIGS. 3, 4, 5, 6 and 7, respectively. Various embodiments according to the present innovations may include assistance data for WiFi AP mobile centric location that includes information for WiFi AP location such as a floor level, a building wing, an area of a stadium, or other similar such details or new data fields. Sets of WiFi APs may also be indicated in assistance data to a SET where each set of WiFi APs may include only WiFi APs that are nearby to one another and share common attributes such as being on the same floor of a building or being in the same part of building. A set of WiFi APs may be indicated by assistance data as being related to one or more other sets of WiFi APs such as via floor level relationships or horizontal distances, thus enabling a SET to know when to change from measuring WiFi APs in one set to measuring WiFi APs in another set when the SET determines that attributes of another set (e.g. building floor level) are a closer fit to the current SET location. Improvements may include enabling assistance data describing sets of WiFi APs to be refreshed when data changes for these sets or to be cancelled when a SET is out of coverage of WiFi APs in these sets.

Improvements may further include providing assistance data using LPP/LPPe from an SLP to a SET that links WiFi APs that can be received at the same location, and providing location instructions from an SLP to a SET that triggers a SET to signal when WiFi APs not in the received LPP/LPPe assistance data are detected or when APs in the assistance data are not detected where expected. Such innovations may improve system response to changes in AP deployment, and/or may enable automated feedback, error/failure detection, and/or automated AP mapping. Such enhancements may additionally be applied to assistance data and location support for femtocells (e.g. home base stations) in addition to or instead of for WiFi APs.

Additionally, in certain embodiments utilizing WiFi AP network centric location, the location server may know which WiFi AP or APs are associated with a SET from the SUPL Location ID parameter provided by a SET (e.g. in a SUPL START message or SUPL POS INIT message). An SLP may then determine the AP currently being used by or most recently accessed by a particular SET. This information may be conveyed by a new SUPL or LPPe parameter or using existing parameters in SUPL and/or LPPe—e.g. using the existing SUPL Location ID and/or Multiple Location IDs parameters. Additional SUPL and/or LPPe parameters may also be used to indicate whether a particular SLP or SET supports network centric WiFi positioning as described herein, and may further identify specific functions supported by a SET or SLP. For example, a capability parameter may be included in a SUPL or LPP/LPPe message indicating any IEEE 802.11v location functions supported by a SET or SLP such as a location track procedure or a timing measurement procedure.

Systems according to the present innovations may further include other additions and enhancements in the LPPe positioning protocol to support WiFi network centric positioning. Such enhancements may enable an SLP to use LPPe (or LPP/LPPe) to invoke WiFi or BT (e.g., Bluetooth) network centric position support as described above. In one potential embodiment, an SLP may send a request for network centric WiFi or BT positioning to a SET in an LPPe Request Location Information (RLI). The SET may confirm, modify or reject the request in an LPPe Provide Location Information (PLI). An LPP/LPPe RLI may include the type of network centric location procedure being requested by an SLP to a SET (e.g. an 802.11v Location Track Procedure), an AP WiFi address if needed and any other parameters. In certain implementations, as part of privacy and security support, a SET global identity could be concealed in any signaling that is accessible to other parties—e.g. in WiFi signaling between a SET and AP used to support SET location. This concealment may be done using ciphering of a MAC address and/or using a temporary MAC address that may be conveyed securely to a SET and a WiFi AP by an SLP and then used for WiFi signaling between the SET and AP. Any ciphered or temporary MAC address may need to be unique (e.g. not assigned to any other AP or SET or assigned to an AP or SET that is known by an SLP either not to be in use or to be at some remote location). The PLI in such embodiments may confirm a SET willingness to participate in WiFi network centric positioning, and an SLP may then instruct one or more WiFi APs to make and return measurements for the SET using an existing IEEE 802.11v location procedure.

Further, in various embodiments, an SLP may use multiple location measurements to calculate a location of a SET. For example, certain APs may make measurements of received SET signal strength, certain APs may make RTT measurements for a SET, and certain APs may make TDOA measurements. Other location measurements may be provided by a SET (via mobile centric positioning) such as location measurements by a SET of signals from cellular base stations and/or satellite global positioning systems. An SLP may thus determine a location of a SET using a mixture of measurements from network centric and mobile centric positioning.

In various embodiments, LPP/LPPe invocation of WiFi AP network centric location, as exemplified in FIG. 5 and FIG. 6 herein, may enable LPP/LPPe SET assisted/SET based mobile centric location in parallel. Such enablement may address security and privacy concerns by having a trusted SLP manage and coordinate both types of location and inform a SET of which methods are being used. Additionally, in certain embodiments, support of WiFi network centric location in LPPe may provide certain flexibility above that possible in SUPL because the invocation can occur at any time as part of other positioning whereas in certain embodiments using enhancements to SUPL, the invocation may only be possible at certain points in a SUPL session.

Figure 8:
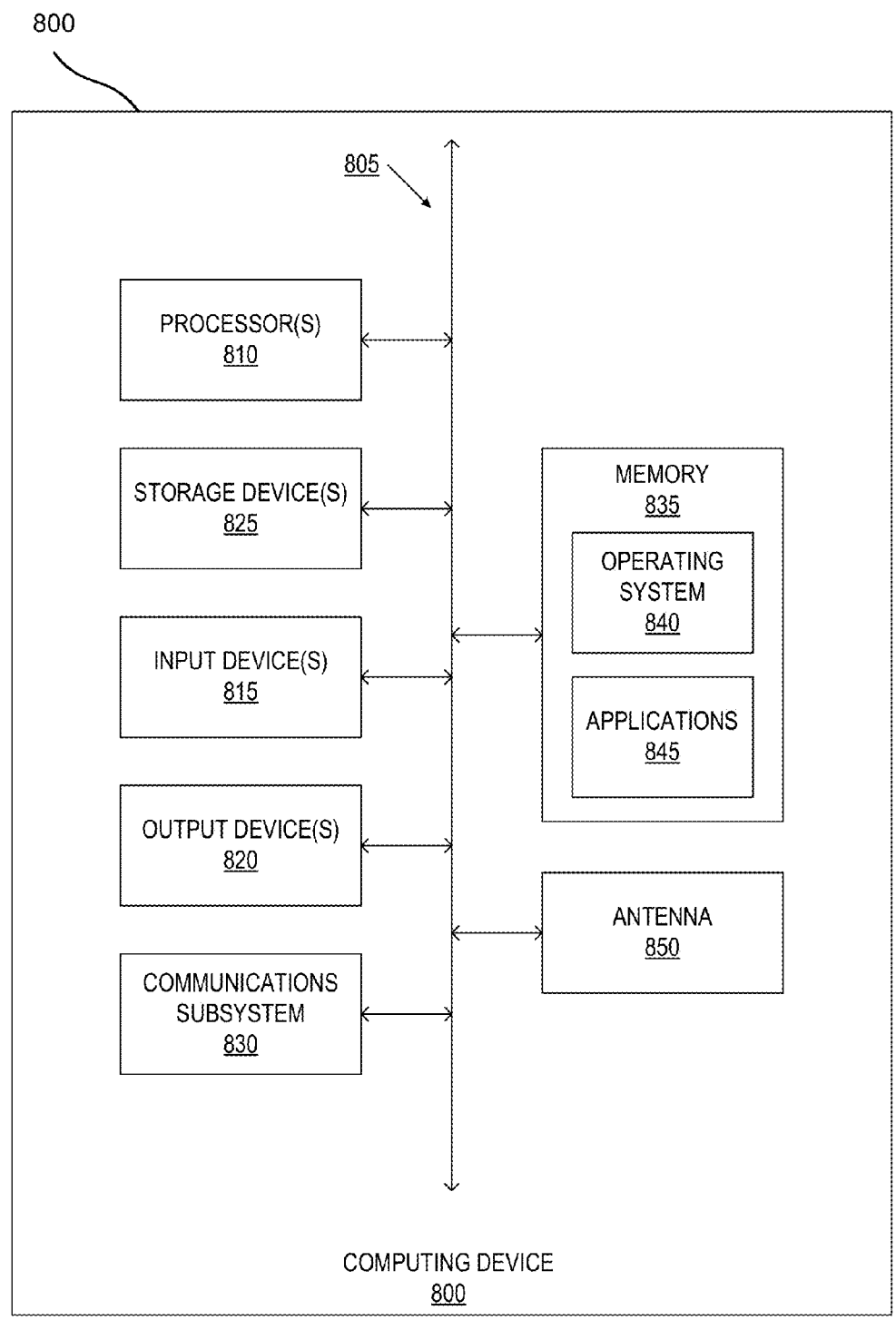
FIG. 8 is an example computing device that may be used in various embodiments in accordance with the innovations presented herein.

FIG. 8 illustrates an example of a computing system in which one or more embodiments may be implemented. A computer system as illustrated in FIG. 8 may be incorporated as part of the previously described computing device, including various UE, SET, server, and AP devices such as UE 130, D-SLP 110, H-SLP 150 and AP 120 of FIG. 1, or any other SET, AP, or SLP computing devices shown in FIGS. 2-7. Additionally, any computing device as described herein may include any combination of components. For example, SET 730, APs 721 or 722, or D-SLP 710 may be structured using the computing device 800 of FIG. 8 or any element of computing device 800. Additionally, in various embodiment, elements of various computing may be structured as stand-alone computing devices such that computing devices are made up of distributed or flexible structures of elements, or structured as any functional mix of computing elements described herein. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or similar communication interfaces. The communications subsystem 830 may permit data to be exchanged with a network (such as the network described below, to name one example), other computer systems, and/or any other devices described herein. In many embodiments, the computer system 800 will further comprise a non-transitory working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an activity selection subsystem configured to provide some or all of the features described herein relating to the selection of activities by a context assistance server 140 can comprise hardware and/or software that is specialized (e.g., an application-specific integrated circuit (ASIC), a software method, etc.) or generic (e.g., processor(s) 810, applications 845, etc.) Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein to perform methods of network based location using SUPL, LPP, or other such network based location services described in FIGS. 3-7.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals).

In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communications subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a non-transitory storage device 825 either before or after execution by the processor(s) 810.

Computer system 800 may further include one or more antennas 850 for wireless communication (e.g. between computer system 800 and one or more cellular, WiFi or BT devices such as a SET, AP or base station). Such communication may originate from and/or be directed to communications subsystem 830. Antenna 850 may be further or instead used to receive signals from navigation satellites (e.g. GPS satellites) which may provide information to, or enable measurements by, computing system 800 (e.g. using communications subsystem 830) for the purpose of locating computer system 800 or obtaining time information (e.g. common GPS time) by computer system 800.

In various embodiments as described herein, computing devices may be in communication and may send and receive signals both to implement location measurements and also to communicate general information between computing devices. For example communication links 188, 190 and 191 in FIG. 1 and communication links 288 and 289 in FIG. 2 may include or comprise wireless communication links both for communicating information for location and/or distance measurements related to APs and other computing devices and for performing location measurements.

Figure 9:
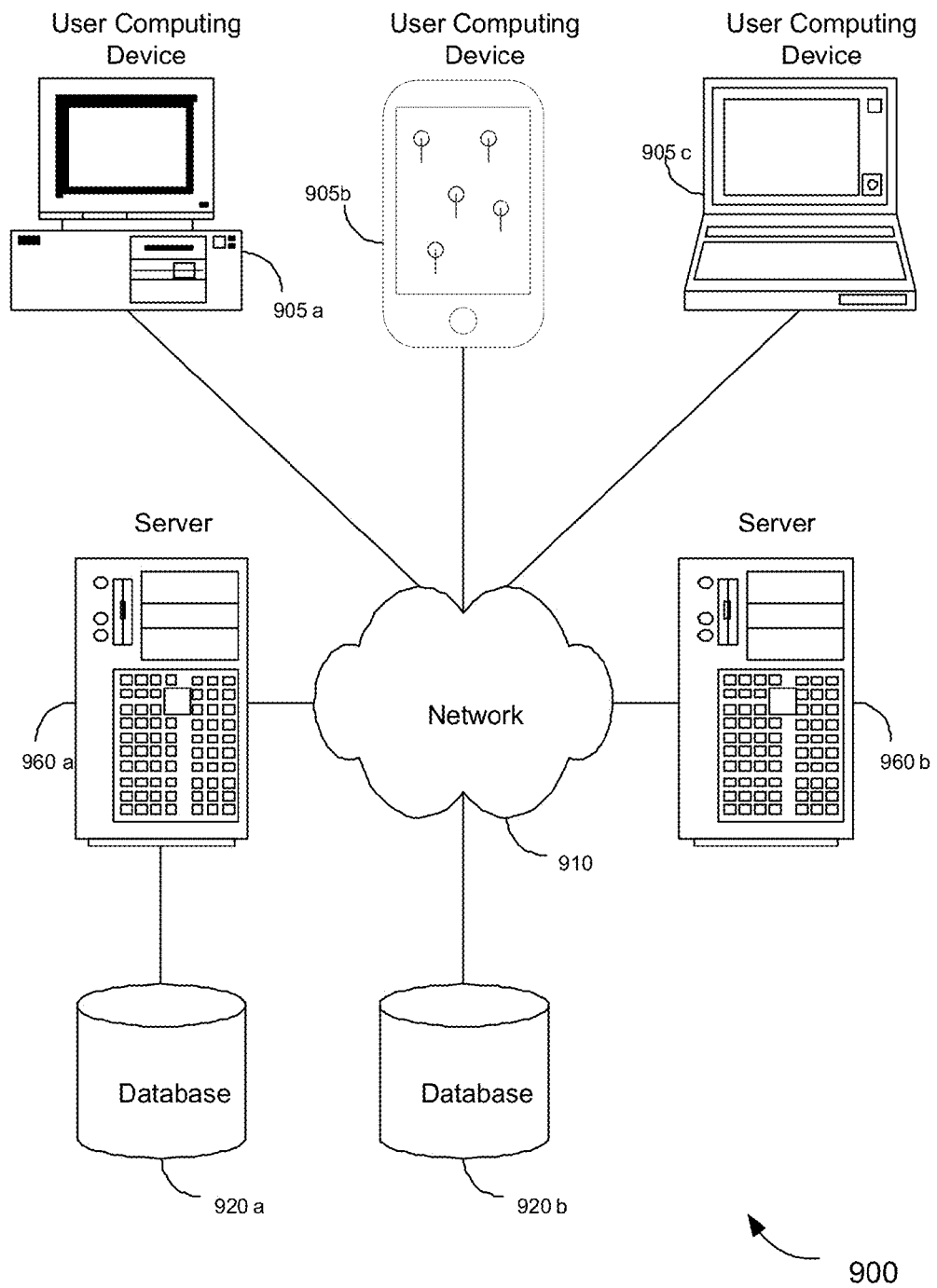
FIG. 9 is an example networked computing system that may be used in various embodiments to enable communications between computing devices in accordance with the innovations presented herein.

FIG. 9 illustrates a schematic diagram of a system 900 of computing devices in communication with one another that can be used in accordance with one set of embodiments. The system 900 can include one or more user computing devices 905. The user computing devices 905 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computing devices 905 can also have any of a variety of applications, including one or more applications configured to perform methods of the invention, as well as one or more office applications, database client and/or server applications, and web browser applications. Alternatively, the user computing devices 905 can be any other electronic device, such as a thin-client computer, cellphone, smart-phone, tablet, Internet-enabled mobile telephone, and/or personal digital assistant (PDA), capable of communicating via a network (e.g., the network 910 described below) and/or displaying and navigating web pages or other types of electronic documents. Computing devices may support SUPL and LPP/LPPe and may represent a SET (e.g. SET 130 in FIG. 1). Although the exemplary system 900 is shown with three user computing devices 905, any number of user computing devices can be supported.

Certain embodiments of the invention operate in a networked environment, which can include a network 910. The network 910 can be any type of network familiar to those skilled in the art that can support data and/or voice communications using any of a variety of commercially-available protocols, including, without limitation, TCP/IP, SNA, IPX, AppleTalk, and the like. Merely by way of example, the network 910 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth™ protocol known in the art, and/or any other wireless protocol; and/or any combination of these and/or other networks. Network 910 may also be a wireless network and may support wireless technologies like GSM, WCDMA, LTE, CDMA and IEEE 802.11 WiFi.

Embodiments of the invention can include one or more server computers 960. Each of the server computers 960 may be configured with an operating system, including, without limitation, any of those discussed above, as well as any commercially (or freely) available server operating systems. Each of the servers 960 may also be running one or more applications, which can be configured to provide services to one or more user computing devices 905 and/or other servers 960.

Merely by way of example, one of the servers 960 may be a web server, which can be used, merely by way of example, to process requests for web pages or other electronic documents from user computing devices 905 in addition to the wireless location measurement usage described throughout. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computing devices 905 to perform methods of the invention. Servers 960 may also include location servers such as a D-SLP or H-SLP (e.g. D-SLP 110 and H-SLP 150 in FIG. 1).

The server computers 960, in some embodiments, might include one or more application servers, which can include one or more applications accessible by a client running on one or more of the client computers 905 and/or other servers 960. Merely by way of example, the server(s) 960 can be one or more general purpose computers capable of executing programs or scripts in response to the user computing devices 905 and/or other servers 960, including, without limitation, web applications (which might, in some cases, be configured to perform methods of the invention). Merely by way of example, a web application can be implemented as one or more scripts or programs written in any suitable programming language, such as Java™, C, C# or C++, and/or any scripting language, such as Perl, Python, or TCL, as well as combinations of any programming/scripting languages. The application server(s) can also include database servers, including without limitation those commercially available from Oracle™ Microsoft™, Sybase™, IBM™, and the like, which can process requests from clients (including, depending on the configurator, database clients, API clients, web browsers, etc.) running on a user computing device 905 and/or another server 960. In some embodiments, an application server can create web pages dynamically for displaying the information in accordance with embodiments of the invention, such as information communicated from an SLP to a web page for viewing by an authorized third party tracking request. Data provided by an application server may be formatted as web pages (comprising HTML, Javascript, etc., for example) and/or may be forwarded to a user computing device 905 via a web server (as described above, for example). Similarly, a web server might receive web page requests and/or input data from a user computing device 905 and/or forward the web page requests and/or input data to an application server. In some cases a web server may be integrated with an application server.

In accordance with further embodiments, one or more servers 960 can function as a file server and/or can include one or more of the files (e.g., application code, data files, etc.) necessary to implement methods of the invention incorporated by an application running on a user computing device 905 and/or another server 960. Alternatively, as those skilled in the art will appreciate, a file server can include all necessary files, allowing such an application to be invoked remotely by a user computing device 905 and/or server 960. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920*a* might reside on a storage medium local to (and/or resident in) a server 960*a* (and/or a user computing device 905). Alternatively, a database 920*b* can be remote from any or all of the computers 905 or servers 960, so long as the database 920*b* can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905 or servers 960 can be stored locally on the respective computer and/or remotely, as appropriate.) In one set of embodiments, the database 920 can be a relational database, such as an Oracle™ database, that is adapted to store, update, and retrieve data in response to SQL-formatted commands. The database might be controlled and/or maintained by a database server, as described above, for example. Such databases may store information related to location assistance data (e.g. for SUPL or LPP/LPPe), AP location and identification, securing information, or other such information that may enable various embodiments of network location according to the embodiments described herein.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application various embodiments. Also, a number of steps may be undertaken before, during, or after the above elements are considered. Accordingly, the above description does not limit the scope of the disclosure.

What is claimed is:

1. A method of locating a mobile device comprising:
receiving, at a location server, positioning information from the mobile device via a user plane location session, the positioning information including data identifying at least one access point that the mobile device has received signaling from;
selecting, by the location server, the at least one access point for communication with based on the data identifying the at least one access point;
communicating, based on the selecting, from the location server to the at least one access point an instruction to initiate a location measurement for the mobile device wherein the instruction is based at least in part on the received positioning information;
receiving, at the location server, from the at least one access point, results of the location measurement; and
determining a location of the mobile device based, at least in part, on the results of the location measurement.

2. The method of claim 1 wherein the received positioning information comprises a parameter related to mobile device support of location measurement by the at least one access point.

3. The method of claim 1 wherein the received positioning information comprises a mobile device confirmation for the location measurement by the at least one access point.

4. The method of claim 1 wherein the location server comprises a Secure User Plane Location (SUPL) Location Platform (SLP) and wherein the mobile device comprises a SUPL enabled terminal (SET).

5. The method of claim 4 wherein the received positioning information is contained in at least one SUPL User Plane Location Protocol (ULP) parameter.

6. The method of claim 4 wherein the received positioning information is contained in at least one Long Term Evolution (LTE) Positioning Protocol (LPP) Extensions (LPPe) parameter.

7. The method of claim 6 wherein the at least one LPPe parameter is contained in at least one of an LPP/LPPe Request Location Information message and an LPP/LPPe Provide Location Information message.

8. The method of claim 1 wherein communicating from the location server to the at least one access point the instruction to initiate the location measurement for the mobile device further comprises:
identifying a plurality of access points within range of the mobile device; and
coordinating, by the location server, location measurements of the mobile device from each access point of the plurality of access points.

9. The method of claim 8 wherein the location measurement comprises at least one of a Time Difference of Arrival (TDOA), Round Trip Time (RTT), signal strength and signal to noise ratio.

10. The method of claim 9 wherein the location measurement comprises TDOA measurements obtained according to an IEEE 802.11 location track procedure.

11. The method of claim 5 further comprising receiving a least one of a SUPL START message and a SUPL POS INIT message at the SLP from the mobile device wherein the at least one SUPL START message and the SUPL POS INIT message comprises a ULP parameter indicating SET capabilities to support the location measurement by the at least one access point.

12. The method of claim 1 further comprising:
receiving from the mobile device a mobile centric location result, wherein the mobile centric location result is received using the user plane location session; and
determining a location of the mobile device based on the results of the location measurement and the mobile centric location result.

13. The method of claim 12 wherein the mobile centric location result comprises at least one of a location estimate and a signal measurement for at least one access point, navigation satellite or cellular base station.

14. A location server comprising: a memory; a processor coupled to the memory; and an output device coupled to the processor; wherein the processor is configured to:
receive positioning information from a mobile device via a user plane location session, the positioning information including data identifying at least one access point that the mobile device has received signaling from;
select the at least one access point for communication with based on the data identifying the at least one access point;
communicate, based on the selecting, from the location server to the at least one access point, an instruction to initiate a location measurement for the mobile device wherein the instruction is based at least in part on the received positioning information; receive from the at least one access point, results of the location measurement; and determine a location of the mobile device, based at least in part, on the results of the location measurement.

15. The location server of claim 14 wherein the location server comprises a Secure User Plane Location (SUPL) Location Platform (SLP) and wherein the mobile device comprises a SUPL enabled terminal (SET).

16. The location server of claim 14 wherein the received positioning information is contained in at least one Long Term Evolution (LTE) Positioning Protocol (LPP) Extensions (LPPe) parameter.

17. The location server of claim 16 wherein the at least one LPPe parameter is contained in at least one of an LPP/LPPe Request Location Information message and an LPP/LPPe Provide Location Information message.

18. A non-transitory computer readable medium comprising computer readable instructions that, when executed by a processor, cause a location server to perform a method of locating a mobile device, the method comprising:
receiving, at a location server, positioning information from a mobile device via a user plane location session, the positioning information including data identifying at least one access point that the mobile device has received signaling from;
selecting, by the location server, the at least one access point for communication with based on the data identifying the at least one access point;
communicating, based on the selecting, from the location server to the at least one access point, an instruction to initiate a location measurement for the mobile device wherein the instruction is based at least in part on the received positioning information;
receiving, at the location server, from the at least one access point, results of the location measurement; and
determining a location of the mobile device based, at least in part, on the results of the location measurement.

19. The non-transitory computer readable medium of claim 18 wherein the method further comprises:
receiving a first set of location measurements from a first access point; and receiving a second set of location measurements from a second access point;
wherein determining the location of the mobile device comprises calculating, by the processor, the location of the mobile device using a first known location of the first access point, a second known location of the second access point, the first set of location measurements, and the second set of location measurements.

20. The non-transitory computer readable medium of claim 18 wherein the location server comprises a Secure User Plane Location (SUPL) Location Platform (SLP) and wherein the mobile device comprises a SUPL enabled terminal (SET).

21. The non-transitory computer readable medium of claim 20 wherein the received positioning information is contained in at least one SUPL User Plane Location Protocol (ULP) parameter.

22. A location server comprising: means for receiving, at the location server, positioning information from a mobile device via a user plane location session, the positioning information including data identifying at least one access point that the mobile device has received signaling from;
means for selecting, by the location server, the at least one access point for communication with based on the data identifying the at least one access point;
means for communicating, based on the selecting, from the location server to the at least one access point, an instruction to initiate a location measurement for the mobile device wherein the instruction is based at least in part on the received positioning information;
means for receiving, at the location server, from the at least one access point, results of the location measurement; and means for determining a location of the mobile device based, at least in part, on the results of the location measurement.

23. The location server of claim 22 further comprising:
means for identifying a requesting external client to the mobile device and receiving authorization from a user of the mobile device to locate the mobile device.

24. A method of locating a mobile device comprising:
sending positioning information from the mobile device to a location server via a user plane location session, the positioning information including data identifying at least one access point that the mobile device has received signaling from, the positioning information operable to select, from the at least one access point, one of the at least one access point for communication with to perform a location measurement of the mobile device; and
receiving, at the mobile device, a communication from the at least one access point as part of a location measurement for the mobile device, wherein the communication from the at least one access point is based, at least in part, on the location server selecting, based on the sent positioning information operable to select the one of the at least one access point for communication with to perform a location measurement of the mobile device, select the one of the at least one access point.

25. The method of claim 24 further comprising:
receiving, at the mobile device, a location of the mobile device from the location server as determined by the location server based, at least in part, on the location measurement.

26. The method of claim 24 wherein the location measurement comprises at least one of a round trip time measurement, a time difference of arrival measurement, a received signal strength measurement and a signal to noise ratio measurement.

27. The method of claim 24 wherein the sent positioning information comprises a parameter related to the mobile device support of the location measurement from the at least one access point.

28. The method of claim 24 wherein the sent positioning information comprises a mobile device confirmation for the location measurement from the at least one access point.

29. The method of claim 24 wherein the location server comprises a Secure User Plane Location (SUPL) Location Platform (SLP) and wherein the mobile device comprises a SUPL enabled terminal (SET).

30. The method of claim 29 wherein the sent positioning information is contained in at least one SUPL User Plane Location Protocol (ULP) parameter.

31. The method of claim 29 wherein the sent positioning information is contained in at least one Long Term Evolution (LTE) Positioning Protocol (LPP) Extensions (LPPe) parameter.

32. The method of claim 31 wherein the at least one LPPe parameter is contained in at least one of an LPP/LPPe Request Location Information message and an LPP/LPPe Provide Location Information message.

33. A mobile device comprising: a memory; and a processor coupled to the memory; wherein the processor is configured to:
send, from the mobile device, positioning information to a location server via a user plane location session, the positioning information including data identifying at least one access point that the mobile device has received signaling from, the positioning information operable to select, from the at least one access point, one of the at least one access point for communication with to perform a location measurement of the mobile device; and
receive, at the mobile device, a communication from the selected one of the at least one access point as part of a location measurement for the mobile device, wherein the communication from the at least one access point is based, at least in part, on the location selecting, based on the sent positioning information operable to select the one of the at least one access point for communication with to perform a location measurement of the mobile device, select the one of the at least one access point.

34. The mobile device of claim 33 wherein the processor is further configured to receive the location of the mobile device from the location server as determined by the location server based on the location measurement.

35. The mobile device of claim 33 wherein the communication from the at least one access point comprises a request to initiate at least one of an IEEE 802.11 location track procedure and an IEEE 802.11 timing measurement procedure.

36. A mobile device comprising:
means for sending, from the mobile device, positioning information to a location server via a user plane location session, the positioning information including data identifying at least one access point that the mobile device has received signaling from, the positioning information operable to select, from the at least one access point, one of the at least one access point for communication with to perform a location measurement of the mobile device; and means for receiving, at the mobile device, a communication from the selected one of the at least one access point as part of a location measurement for the mobile device, wherein the communication from the at least one access point is based, at least in part, on the location server selecting, based on the sent positioning information operable to select the one of the at least one access point for communication with to perform a location measurement of the mobile device, select the one of the at least one access point.

37. The mobile device of claim 36 further comprising:
means for receiving, at the mobile device, a location of the mobile device from the location server as determined by the location server based, at least in part, on the location measurement.

38. The mobile device of claim 36 further comprising:
means for performing at least one of a plurality of round trip time measurements and a plurality of time difference of arrival measurements from the mobile device to at least two access points including the at least one access point, within a predetermined time window.

39. The mobile device of claim 36 further comprising:
means for reporting a mobile centric location result to the location server using the user plane location session.

40. The mobile device of claim 39 wherein the mobile centric location result comprises at least one of a location estimate and a signal measurement for at least one access point, navigation satellite or cellular base station.

41. A non-transitory computer readable medium comprising computer readable instructions that, when executed by a processor, cause a mobile device to perform a method of locating the mobile device, the method comprising:
sending, from the mobile device, positioning information to a location server via a user plane location session, the positioning information including data identifying at least one access point that the mobile device has received signaling from, the positioning information operable to select, from the at least one access point, one of the at least one access point for communication with to perform a location measurement of the mobile device; and
receiving, at the mobile device, a communication from the selected one of the at least one access point as part of a location measurement for the mobile device, wherein the communication from the at least one access point is based, at least in part, on the location server selecting, based on the sent positioning information operable to select the one of the at least one access point for communication with to perform a location measurement of the mobile device, select the one of the at least one access point.

42. The non-transitory computer readable medium of claim 41 wherein the method further comprises:
receiving, at the mobile device, a location of the mobile device from the location server as determined by the location server based, at least in part, on the location measurement.

43. The non-transitory computer readable medium of claim 41 wherein the method further comprises:
performing at least one of a plurality of round trip time measurements and a plurality of time difference of arrival measurements from the mobile device to at least two access points including the at least one access point, within a predetermined time window.

44. A method of locating a mobile device comprising:
receiving, at an access point, a communication from a location server authorizing a location measurement of the mobile device as part of a secure user plane location (SUPL) session between the location server and the mobile device, wherein the access point is selected by the location server from at least one access point that the mobile device has received signaling from and the receiving the communication is in response to the selecting;
initiating, by the access point, the location measurement for the mobile device, wherein the communication is based at least in part on positioning information communicated from the mobile device to the location server as part of the SUPL session between the location server and the mobile device, the positioning information including data identifying the at least one access point that the mobile device has received signaling from; and communicating to the location server, results of the location measurement.

45. The method of claim 44 wherein the communication from the location server authorizing the location measurement comprises a parameter related to mobile device support of the location measurement.

46. The method of claim 45 wherein the parameter identifies that the mobile device supports round trip time location measurements.

47. The method of claim 45 wherein the parameter identifies that the mobile device supports time difference of arrival measurements.

48. An access point comprising: an antenna; a memory coupled to the antenna; and a processor coupled to the antenna and the memory; wherein the processor is configured to:
receive, at the access point, a communication from a location server authorizing a location measurement of a mobile device as part of a secure user plane location (SUPL) session between the location server and the mobile device, wherein the access point is selected by the location server from at least one access point that the mobile device has received signaling from and the receiving the communication is in response to the selecting;
initiate, by the access point, the location measurement for the mobile device, wherein the communication is based at least in part on positioning information communicated-from the mobile device to the location server as part of the SUPL session between the location server and the mobile device, the positioning information including data identifying the at least one access point that the mobile device has received signaling from; and communicate to the location server, results of the location measurement.

49. The access point of claim 48 wherein the memory comprises a location of the access point, and wherein the access point communicates the location of the access point to the location server along with the results of the location measurement.

50. The access point of claim 48 wherein the processor is further configured to communicate a set of location configuration request frames to the mobile device prior to initiating the location measurement.

51. An access point comprising: means for receiving, at the access point, a communication from a location server authorizing a location measurement of a mobile device as part of a secure user plane location (SUPL) session between the location server and the mobile device, wherein the access point is selected by the location server from at least one access point that the mobile device has received signaling from and the receiving the communication is in response to the selecting;
- means for initiating, by the access point, the location measurement for the mobile device, wherein the communication is based at least in part on positioning information communicated from the mobile device to the location server as part of the SUPL session between the location server and the mobile device, the positioning information including data identifying the at least one access point that the mobile device has received signaling from; and
- means for communicating to the location server, results of the location measurement.

52. The access point of claim 51 further comprising:
- means for verifying, by the access point, the communication from the location server authorizing the location measurement.

53. A non-transitory computer readable medium comprising computer readable instructions that, when executed by a processor, cause an access point to perform a method of locating a mobile device, the method comprising:
- receiving, at the access point, a communication from a location server authorizing a location measurement of the mobile device as part of a secure user plane location (SUPL) session between the location server and the mobile device, wherein the access point is selected by the location server from at least one access point that the mobile device has received signaling from and the receiving the communication is in response to the selecting;
- initiating, by the access point, the location measurement for the mobile device, wherein the communication is based at least in part on positioning information communicated from the mobile device to the location server as part of the SUPL session between the location server and the mobile device, the positioning information including data identifying the at least one access point that the mobile device has received signaling from; and
- communicating to the location server, results of the location measurement.

54. The non-transitory computer readable medium of claim 53 wherein the method further comprises:
- initiating, by the access point, a second location measurement; and
- communicating to the location server, results of the second location measurement.

55. The non-transitory computer readable medium of claim 53 wherein the method further comprises:
- receiving, at the access point, additional location results associated with the mobile device from the mobile device independent of the location measurement; and
- communicating the additional location results from the access point to the location server.

56. The access point of claim 51, further comprising:
- means for obtaining at least one of a round trip time to the mobile device and a time difference of arrival for the mobile device.

* * * * *